United States Patent
Aikawa et al.

(10) Patent No.: US 6,701,731 B2
(45) Date of Patent: Mar. 9, 2004

(54) VEHICLE AIR CONDITIONER WITH COLD STORAGE UNIT

(75) Inventors: Yasukazu Aikawa, Nagoya (JP); Yasushi Yamanaka, Nakashima-gun (JP); Takahisa Suzuki, Kariya (JP); Makoto Kume, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/375,245

(22) Filed: Feb. 27, 2003

(65) Prior Publication Data

US 2003/0159455 A1 Aug. 28, 2003

(30) Foreign Application Priority Data

| Feb. 28, 2002 | (JP) | 2002-053512 |
| Mar. 29, 2002 | (JP) | 2002-093768 |
| Mar. 29, 2002 | (JP) | 2002-093769 |

(51) Int. Cl.[7] .................................................. F25B 41/04
(52) U.S. Cl. ........................................ 62/225; 62/437
(58) Field of Search ........................ 62/225, 437, 438, 62/239, 198, 524, 526

(56) References Cited

U.S. PATENT DOCUMENTS 4,748,823 A * 6/1988 Asano et al. .................. 62/239

6,568,205 B2 * 5/2003 Bureau et al. ................. 62/515
2002/0088246 A1 * 7/2002 Bureau et al. ................. 62/434
2002/0134093 A1 * 9/2002 Aoki et al. ..................... 62/133
2002/0178745 A1 * 12/2002 Kampf .......................... 62/430
2003/0167925 A1 * 9/2003 Aikawa et al. ................ 96/126

FOREIGN PATENT DOCUMENTS

| JP | 2000-94953 | 4/2000 |
| JP | 2000-313226 | 11/2000 |

* cited by examiner

*Primary Examiner*—Marc Norman
(74) *Attorney, Agent, or Firm*—Harness, Dickey & Pierce, PLC

(57) ABSTRACT

An air conditioner for an economically running vehicle includes a compressor driven by a vehicle engine, an evaporator, and a cold-storage heat exchanger having a cold storage material. The evaporator and the cold-storage heat exchanger are disposed in series in a refrigerant flow. When the compressor is operated, the cold storage material is cooled by low-pressure refrigerant in a cold storage mode. When the operation of the compressor is stopped, refrigerant circulates between the evaporator and the cold-storage heat exchanger, so that refrigerant evaporated in the evaporator is cooled and liquefied by the cold storage material in a cold release mode. Further, a flow direction of refrigerant flowing through the evaporator in the cold storage mode is the same as that in the cold release mode.

48 Claims, 24 Drawing Sheets

COOLING / COLD-STORAGE MODE

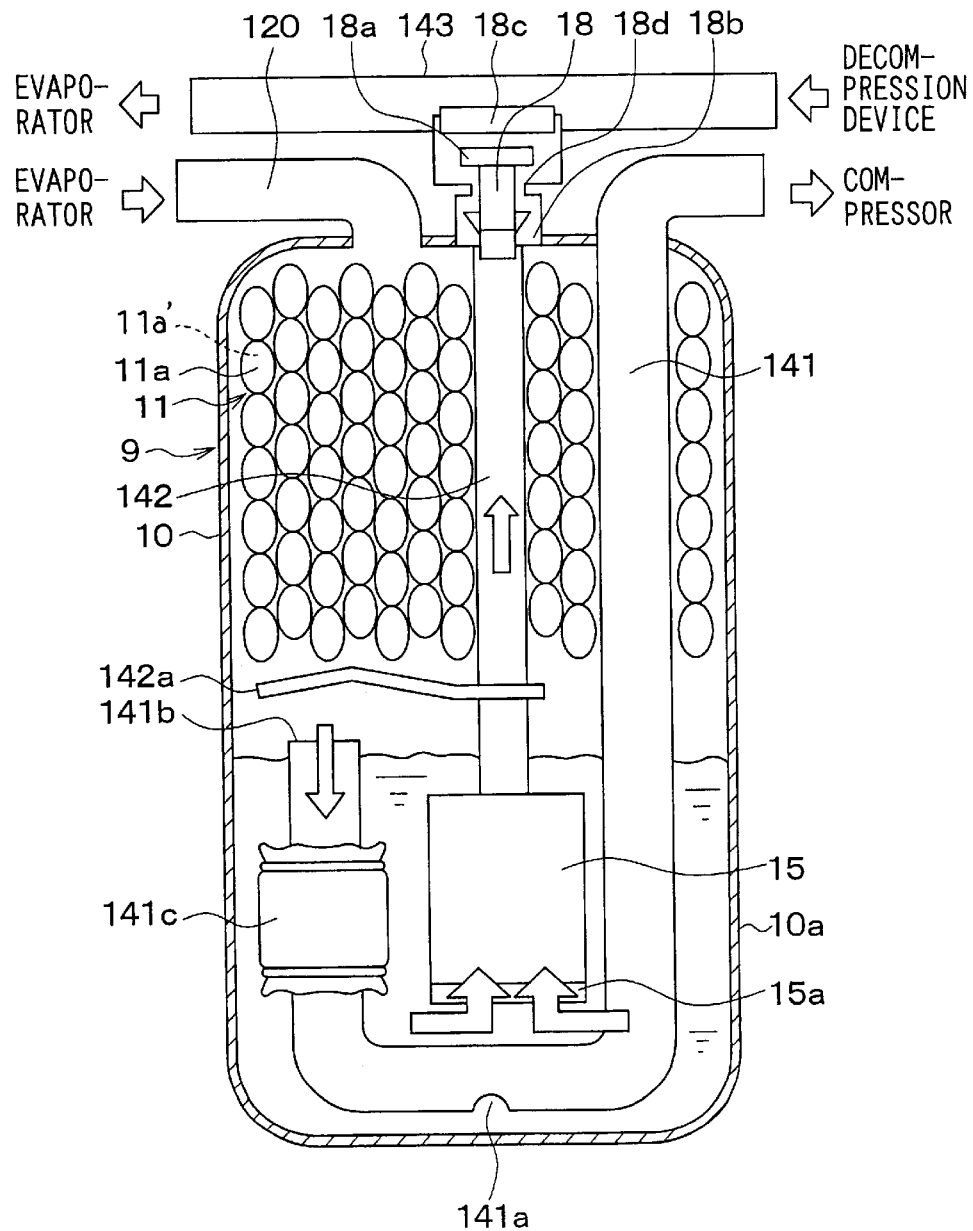

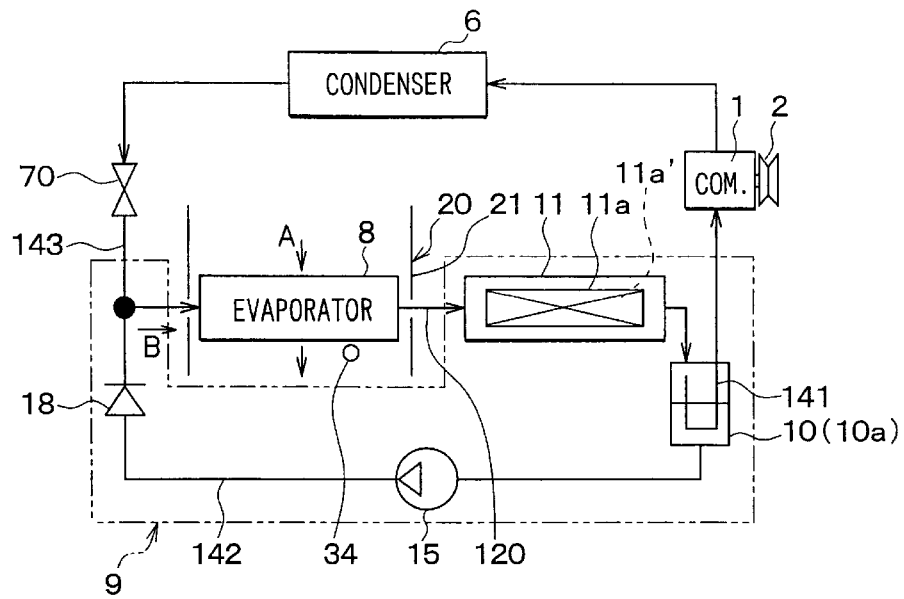
FIG. 9   COOLING / COLD-STORAGE MODE
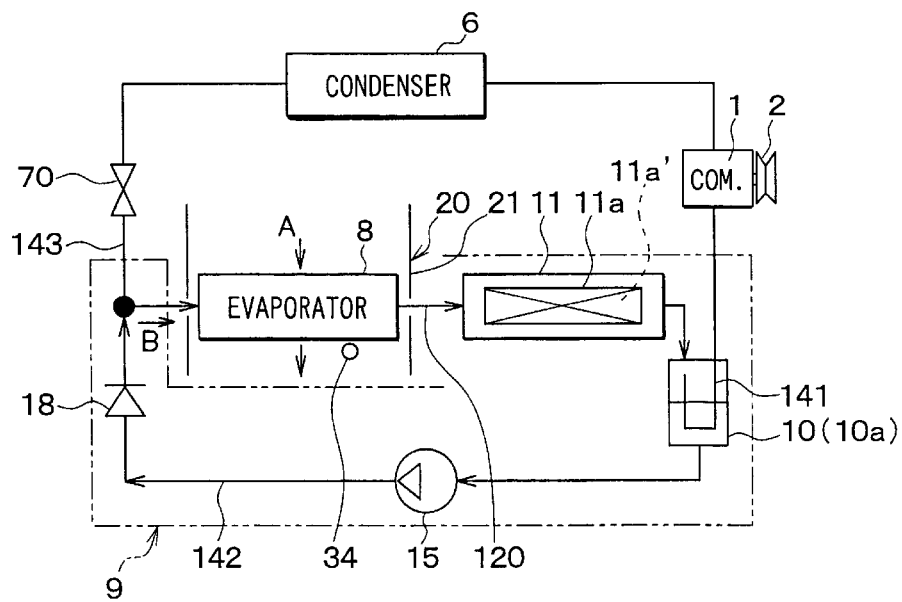
FIG. 10   COLD-RELEASE COOLING MODE

COOLING / COLD-STORAGE MODE

FIG. 22

| | S1 | S2 | S3 |
|---|---|---|---|
| Rd [mm] | 1.5 | 2.6 | 3.1 |
| Ha [m²] | 0.72 | 0.82 | 1.03 |
| Pr | (0.9) | 0.907 | 0.740 |
| Vo [L] | 0.83 | 0.89 | 1.22 |
| TOTAL WEIGHT [kg] | 0.99 | 1.07 | 1.24 |

# VEHICLE AIR CONDITIONER WITH COLD STORAGE UNIT

CROSS-REFERENCE TO RELATED APPLICATIONS

This application is related to and claims priority from Japanese Patent Applications No. 2002-53512 filed on Feb. 28, 2002, No. 2002-93768 filed on Mar. 29, 2002, No 2002-93769 filed on Mar. 29, 2002, No. 2002-155604 filed on May 29, 2002 and No. 2002-372092 filed on Dec. 24, 2002, the contents of which are hereby incorporated by reference.

BACKGROUND OF THE INVENTION

1. Field of the Invention

The present invention relates to a cold-storage type air conditioner for a vehicle including a vehicle engine that is used as a drive source of a compressor. The vehicle engine is stopped when the vehicle stops.

2. Description of Related Art

In recent years, in order to protect the environment and to reduce fuel consumption of a vehicle engine, a vehicle (e.g., economically running vehicle such as a hybrid vehicle) automatically stopping its engine at a time of a stoppage of the vehicle such as in waiting for a change of a traffic signal has been practically used, and hereafter, there is a tendency to increase the number of this-type vehicles. In an air conditioner for a vehicle, a compressor of a refrigerant cycle is generally driven by a vehicle engine. Therefore, in the economically running vehicle described above, the compressor is also stopped at every stoppage of the engine. Accordingly, in this case, a temperature of a cooling evaporator increases, and an air temperature blown into a passenger compartment increases, so that a cooling feeling for a passenger in the passenger compartment is damaged.

To overcome this problem, an air conditioner with a cold storage unit is provided. In this air conditioner, when operation of the vehicle engine (compressor) is stopped and cooling operation of an evaporator is stopped, air to be blown into the passenger compartment is cooled by using cold release operation of the cold storage unit. For example, in a cold-storage type air conditioner disclosed in JP-A-2000-313226, a cold storage tank having therein a cold storage material is disposed in parallel with an evaporator in a refrigerant flow direction, so that refrigerant decompressed by a decompression unit is circulated to the evaporator and the cold storage tank in parallel when the vehicle engine operates. Thus, the cold storage material is cooled while the vehicle engine operates, thereby performing cold storage (cold accumulation) in the cold storage material. When the operation of the compressor is stopped with the stop of the vehicle engine, liquid refrigerant in the cold storage tank is circulated to the evaporator. Accordingly, even when the operation of the compressor is stopped, a cooling capacity of the evaporator can be continuously obtained, so that the passenger compartment can be cooled.

However, in the air conditioner, since the cold storage tank and the evaporator are connected in parallel in the refrigerant flow direction, refrigerant decompressed by a decompression unit such as an expansion valve is divided to be supplied to the cold storage tank and to the evaporator. Therefore, in a large cooling-load condition such as in the summer, an amount of refrigerant circulated to the cooling evaporator becomes deficient, and cooling capacity of the evaporator becomes deficient. Further, after solidification of the cold storage material is completed, that is, after cold accumulation (cold storage) is completed, low-pressure refrigerant generally does not absorb heat from the cold storage material. Therefore, in this case, the low-pressure refrigerant passes through the cold storage tank while almost being not evaporated. Further, the low-pressure refrigerant from the cold storage tank joins with refrigerant at an outlet of the evaporator, and the joined refrigerant is sucked into the compressor.

Because the expansion valve controls a super-heating degree of the joined refrigerant, an opening degree of the expansion valve is also changed in accordance with low-dryness refrigerant from the cold storage tank. Therefore, the open degree of the expansion valve is adjusted excessively smaller with respect to the super-heating degree of refrigerant at the outlet of the evaporator. Thus, a refrigerant flow amount in the evaporator becomes smaller with respect to a cooling load of the evaporator, and cooling capacity of the evaporator cannot be sufficiently obtained. In order to accurately control the opening degree with respect to the cooling load, a solenoid valve is need in a refrigerant passage of the cold storage tank. In a case where the solenoid valve is provided, when the cooling performance is insufficient while the vehicle engine (compressor) operates, refrigerant circulation into the cold storage tank is stopped by closing the solenoid valve. Only when the cooling capacity of the evaporator is sufficient, the low-pressure refrigerant is circulated to the cold storage tank by opening the solenoid valve, and the cold storage of the cold storage material is performed. In this case, because the solenoid valve is required and a control mechanism for controlling the solenoid valve is also required, production cost of the air conditioner with a cold storage unit is increased. Further, the structure of the cold storage unit including the solenoid unit becomes complex, and the size of the cold storage unit is increased. Therefore, the cold storage unit is difficult to be mounted in the vehicle.

SUMMARY OF THE INVENTION

In view of the above-described problems, it is an object of the present invention to provide a vehicle air conditioner with a cold-storage heat exchanger, which effectively improves cooling capacity and cold-storage capacity while having a simple structure.

It is another object of the present invention to provide a vehicle air conditioner with a cold-storage heat exchanger, which improves condensation capacity of gas refrigerant in the cold-storage heat exchanger in a cold release mode.

It is -a further another object of the present invention to provide a vehicle air conditioner with a cold-storage heat exchanger, which improves heat-exchanging performance of an evaporator in the cold release mode when a compressor is stopped.

It is a further another object of the present invention to provide an air conditioner with a cold-storage heat exchanger, which can be readily mounted in a vehicle.

According to the present invention, in an air conditioner for a vehicle having an engine that is stopped when the vehicle stops, a compressor is driven by the engine, a high-pressure side heat exchanger is disposed to radiate heat of refrigerant discharged from the compressor, a decompression unit decompresses refrigerant flowing from the high-pressure side heat exchanger, and refrigerant from the decompression unit is evaporated in an evaporator so that air to be blown into a passenger compartment of the vehicle is cooled. Further, the air conditioner includes a cold-storage heat exchanger having therein a cold storage material for performing a cold storage operation where the cold storage material is cooled by refrigerant from the decompression unit, and a cold release operation where refrigerant circulates between the evaporator and the cold-storage heat exchanger so that gas refrigerant evaporated in the evaporator is cooled by cold release of the cold storage material in the cold-storage heat exchanger. In the air conditioner, the cold storage heat exchanger and the evaporator are connected in series in a refrigerant flow, such that the cold storage operation of the cold storage material is performed when the compressor operates, and the cold release operation of the cold storage material is performed when operation of the compressor is stopped with a stop of the engine. Because the cold-storage heat exchanger and the evaporator are disposed in series in the refrigerant flow, refrigerant always flows through the heat-storage heat exchanger and the evaporator by the operation of the compressor when the compressor operates. Therefore, the cooling capacity in the evaporator and the cold-storage capacity in the cold-storage heat exchanger can be effectively improved while the compressor operates. Further, it is possible to improve the cooling capacity and the cold-storage capacity without using a solenoid valve for switching a refrigerant flow in the cold-storage heat exchanger.

Preferably, the decompression unit is an expansion valve that adjust a flow amount of refrigerant in accordance with a super-heating degree of refrigerant at a refrigerant outlet of the evaporator. Further, the cold-storage heat exchanger is disposed upstream from the evaporator in the refrigerant flow. Therefore, a refrigerant flow amount circulating in a refrigerant cycle can be suitably adjusted.

When a tank is disposed downstream from the evaporator in the refrigerant flow such that refrigerant from the evaporator is separated into gas refrigerant and liquid refrigerant in the tank, the tank is coupled to the compressor such that gas refrigerant in the tank is introduced to a suction portion of the compressor. In this case, the cold-storage heat exchanger is disposed downstream from the evaporator in the refrigerant flow so that refrigerant passing through the cold-storage heat exchanger is sucked into the suction portion of the compressor after passing through an inner space of the tank when the compressor operates. Therefore, low-pressure refrigerant passing through the cold-storage heat exchanger is sucked to the compressor after passing through the inner space of the tank, and the liquid refrigerant is stored in the tank. Thus, in this case, even when the expansion valve is not used, it can prevent liquid refrigerant from being introduced to the compressor. Further, because the temperature of refrigerant in a refrigerant passage of the evaporator is decreased from an inlet to an outlet of the evaporator due to pressure loss in the refrigerant passage of the evaporator, the cold storage material can be effectively cooled by the low-pressure refrigerant.

According to the present invention, a tank for storing liquid refrigerant condensed in the cold-storage heat exchanger is provided so that liquid refrigerant is stored in the tank under the cold-storage heat exchanger. In this case, when the operation of the compressor stops with a stop of the engine, liquid refrigerant in the tank is introduced to the evaporator, and gas refrigerant evaporated in the evaporator is introduced to the cold-storage heat exchanger to be cooled and condensed by the cold release operation of the cold storage material. Therefore, when the compressor stops, liquid refrigerant condensed by the cold-storage heat exchanger can be rapidly introduced under the cold-storage heat exchanger by the gravity of the liquid refrigerant. Thus, all the surfaces of the cold-storage heat exchanger can be effectively used for performing heat exchange, and condensation capacity of gas refrigerant in the cold-storage heat exchanger can be improved in the cold release mode. Further, because a tank portion for storing the liquid refrigerant is positioned under the cold-storage heat exchanger, it is unnecessary to arrange the cold-storage heat exchanger at an upper side of the evaporator. Accordingly, the air conditioner with the cold-storage heat exchanger can be readily mounted on the vehicle.

According to the present invention, a pump is disposed to circulate refrigerant between the cold-storage heat exchanger and the evaporator when the operation of the compressor stops, and the pump is disposed such that a flow direction of refrigerant in the evaporator when the operation of the compressor stops is the same as that when the compressor operates. Therefore, even when the cold release mode is performed when the operation of the compressor is stopped, the heat-exchanging performance in the evaporator can be effectively improved. Preferably, the pump is disposed to be exposed in liquid refrigerant in the tank portion. Thus, when the operation of the compressor is stopped, liquid refrigerant can be readily supplied to the evaporator by the operation of the pump.

Preferably, the cold-storage heat exchanger is disposed in the tank, such that refrigerant flowing to an upper space above the cold-storage heat exchanger flows through the cold-storage heat exchanger downwardly from above, and is U-turned in a lower space under the cold-storage heat exchanger to be sucked to the refrigerant suction port. Therefore, even when a part of the cold-storage heat exchanger is positioned in the liquid refrigerant in the tank, heat-transmission performance in the cold-storage heat exchanger can be effectively improved.

When a part of the cold-storage heat exchanger is positioned in the liquid refrigerant of the tank, a partition member for partitioning a space around the refrigerant suction port from the other space in the tank can be disposed. In this case, the partition member has an opening opened at a lower side of the cold-storage heat exchanger. Accordingly, when the compressor operates, refrigerant under the cold-storage heat exchanger can be effectively introduced to the refrigerant suction port from the opening of the partition member.

Preferably, the cold-storage heat exchanger includes a plurality of tubes through which refrigerant from the decompression unit flows, a plurality of fines disposed to be thermal-connected with the tubes, and a shell that is disposed to accommodate the tubes and the fins. Further, the fins are disposed to have plural heat-transmission surfaces contacting the tubes, and the cold storage material is filled in the shell outside the tubes between the heat-transmission surfaces. Therefore, heat-exchanging capacity in the cold-storage heat exchanger can be effectively improved, and the size of the cold-storage heat exchanger can be reduced. Accordingly, mounting performance of the cold-storage heat exchanger can be improved.

Preferably, the tubes are disposed in the shell to extent vertically. Therefore, condensed liquid refrigerant can readily flow through the tubes in the cold-storage heat exchanger. More preferably, the fins are flat plates disposed substantially in parallel by a predetermined pitch, and the predetermined pitch is in a range of 0.5–2.0 mm. In this case, the heat transmission performance of the cold-storage heat exchanger can be more effectively improved.

Further, in the cold-storage heat exchanger, the fins are disposed in the shell to have a predetermined clearance between the fins and the shell. Therefore, the heat-insulation performance of the cold-storage heat exchanger with an outside can be improved, and the cold-storage heat exchanger can be mounted in an engine compartment with a high temperature.

BRIEF DESCRIPTION OF THE DRAWINGS

Other objects, features and advantages of the present invention will become more apparent from the following detailed description made with reference to the accompanying drawings, in which:

FIG. 8 is a schematic sectional view showing the cold storage unit in FIG. 7;

FIG. 9 is a schematic diagram showing the refrigerant cycle with the cold storage unit in the normal-cooling and cold storage mode, according to the second embodiment;

FIG. 10 is a schematic diagram showing the refrigerant cycle with the cold storage unit in the cold-release cooling mode, according to the second embodiment;

FIG. 22 is a table showing test results in the cold-storage heat exchanger, according to the seventh embodiment and reference examples;

DETAILED DESCRIPTION OF THE PREFERRED EMBODIMENTS

Figure 1:
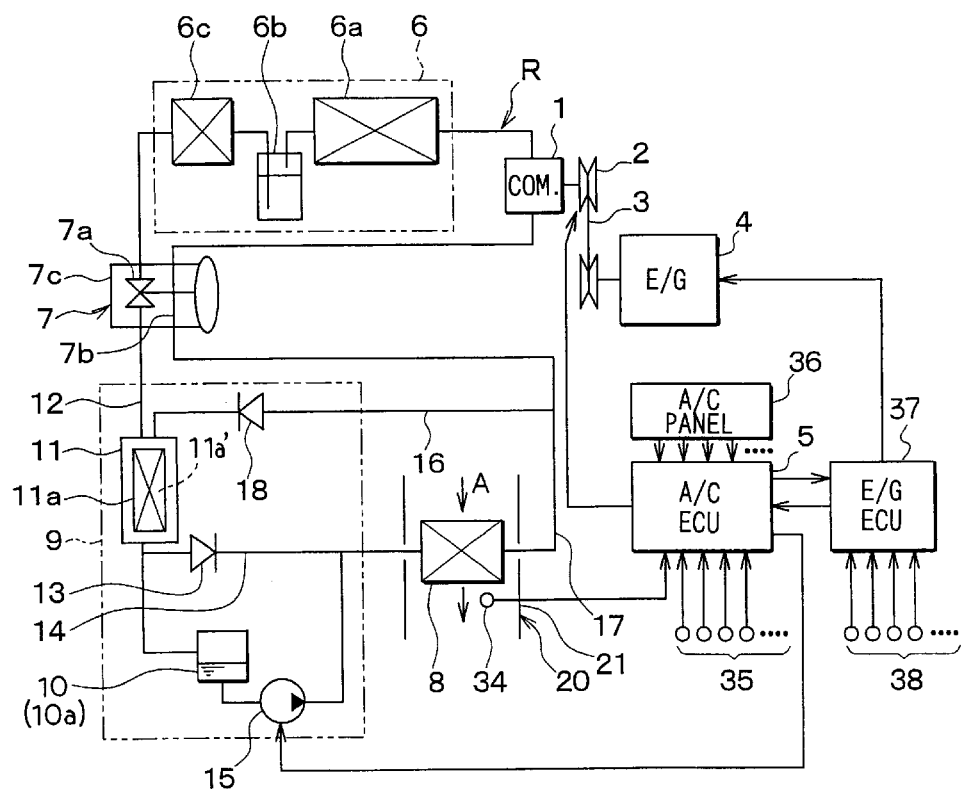
FIG. 1 is a schematic diagram showing an air conditioner having a refrigerant cycle with a cold storage unit, according to a first embodiment of the present invention.

Preferred embodiments of the present invention will be described with reference to the accompanying drawings.
First Embodiment As shown in FIG. 1, a refrigerant cycle R of a vehicle air conditioner according to the first embodiment includes a compressor 1 for sucking, compressing and discharging refrigerant. The compressor 1 includes a solenoid clutch 2 for interrupting motive power supplied to the compressor 1. Motive power of the vehicle engine 4 is transmitted to the compressor 1 through the solenoid clutch 2 and a belt 3. Energization of the clutch 2 is interrupted by an air-conditioning control unit 5, thereby interrupting operation of the compressor 1.

High-temperature and high-pressure refrigerant discharged from the compressor 1 flows into a condenser 6 that is a high-pressure heat exchanger. In the condenser 6, the high-temperature and high-pressure refrigerant is heat exchanged with outside air blown by a cooling fan (not shown), and is cooled to be condensed. The condenser 6 is integrally constructed of a condensing portion 6a, a receiver 6b and a super-cooling portion 6c. The receiver 6b separates refrigerant flowing from the condensing portion 6a into a gas refrigerant and liquid refrigerant, and introduces the liquid refrigerant into the super-cooling portion 6c while storing the liquid refrigerant. The super-cooling portion 6c super-cools the liquid refrigerant flowing from the receiver 6b. The super-cooled refrigerant from the super-cooling portion 6c is decompressed by an expansion valve 7 to be low-pressure gas-liquid refrigerant. The expansion valve 7 is a thermal expansion valve that adjusts an open degree (refrigerant flow amount) of a valve body 7a so as to adjust a super-heating degree of refrigerant at an outlet of an evaporator 8 (i.e., cooling heat exchanger). In the first embodiment, an evaporator outlet passage 7b, into which refrigerant at the outlet of the evaporator 8 flows, is provided in a box-shape housing 7c, and a temperature sensing mechanism of refrigerant at the outlet of the evaporator 8 is provided in the housing 7c. The thermal expansion valve 7 is integrally constructed with the valve body 7a, the evaporator outlet passage 7b, the temperature sensing mechanism and the housing 7c.

Figure 2:
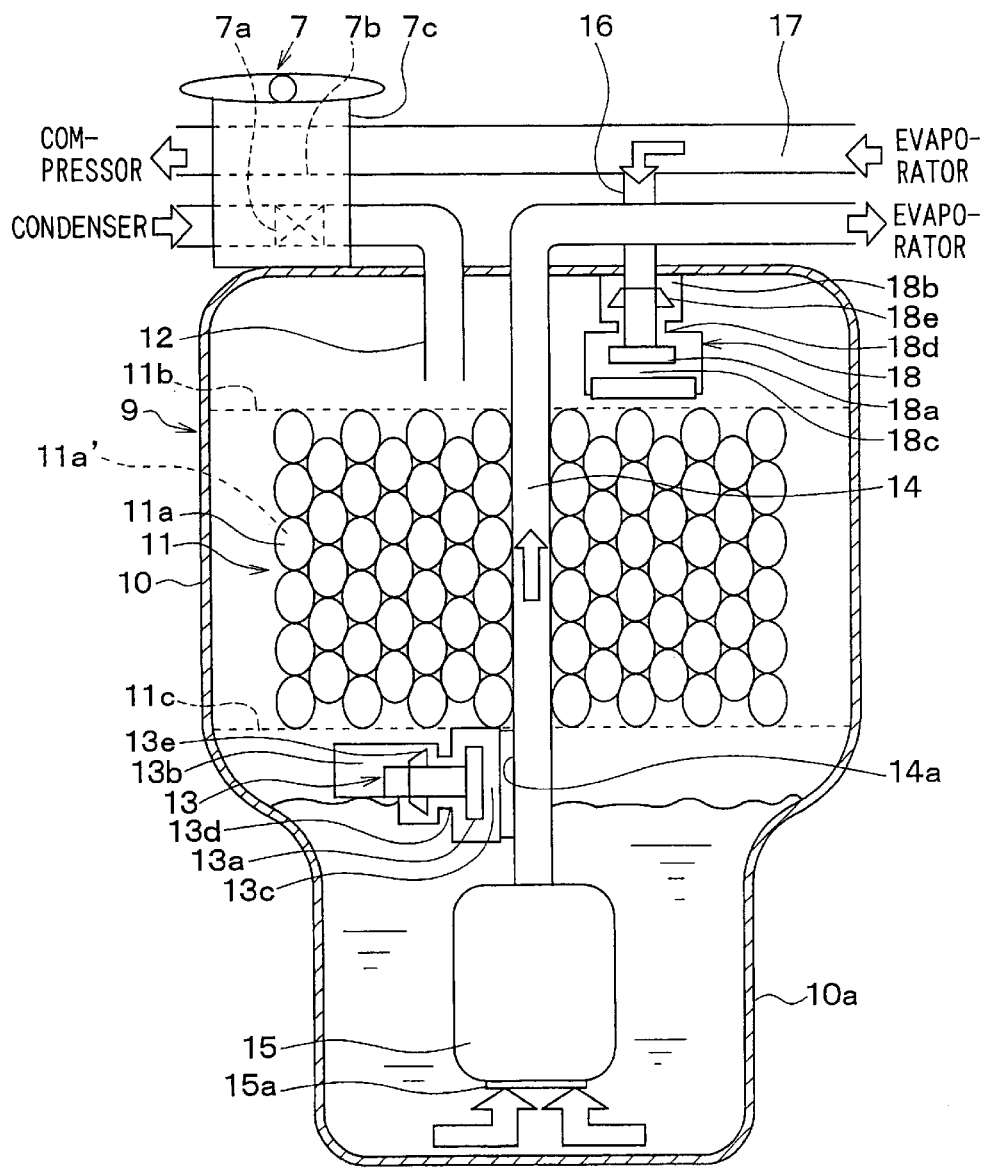
FIG. 2 is a schematic sectional view showing the cold storage unit in FIG. 1.

A cold storage unit 9 is integrally formed by apparatuses enclosed by two-dot chain lines in FIG. 1. Specifically, the apparatuses of the cold storage unit 9 are integrally constructed in a tank body 10, as shown in FIG. 2. The tank body 10 extends cylindrically in an up-down direction, and includes a liquid-refrigerant tank portion 10a for storing low-temperature and low-pressure refrigerant. The liquid-refrigerant tank portion 10a is integrated to the tank body 10 at its lower portion. In the tank body 10, a cold-storage heat exchanger 11 is provided above the liquid-refrigerant tank portion 10a. Specifically, the cold-storage heat exchanger 11 includes plural cold storage containers 11a, a support plate 11c under the plural cold storage containers 11a, and a support plate 11b disposed above the plural cold storage containers 11b. The plural cold storage containers 11a are disposed so as to form clearances therebetween, through which refrigerant passes. The support plates 11b, 11c have refrigerant passage holes, and outer peripheral portions thereof are fixed to an inner wall surface of the tank body 10.

Figure 3A:
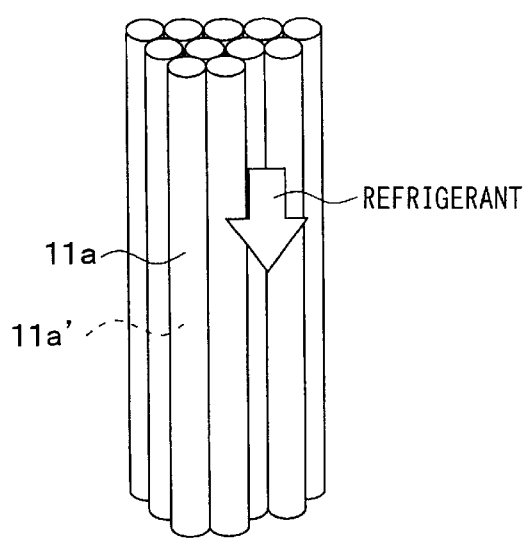
FIGS. 3A, 3B and 3C are perspective views each of which shows cold storage containers used for the cold storage unit, according to the first embodiment.
Figure 3B:
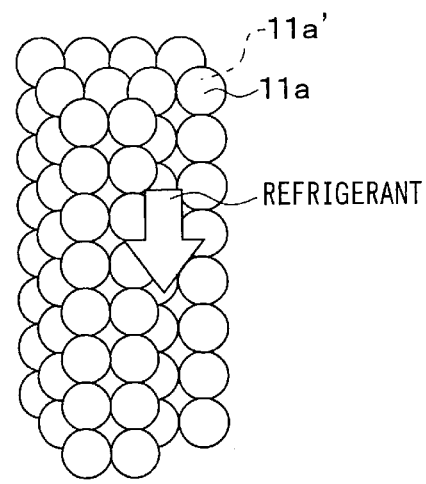
Figure 3C:
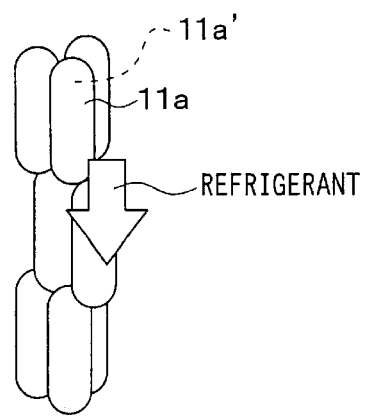

The cold storage container 11a can be formed into any one of a cylindrical shape extending in a refrigerant flow direction shown in FIG. 3A, a spherical shape shown in FIG. 3B and a capsule shape shown in FIG. 3C. The cold storage container 11a can be formed by a resin film member or a metal plate member of metal such as an aluminum plate. A material, having a solidification point higher than a temperature of low-pressure refrigerant, is selected as a cold storage material 11a' (cold accumulation material) sealed in the cold storage container 11a. That is, the material is selected such that the material can be changed from a liquid phase to a solid phase and the material can accumulate cold as the solidification latent heat while the material is cooled by the low-pressure refrigerant.

Here, the low-pressure refrigerant is controlled at a temperature of 3–4° C. in order to prevent the evaporator 8 from being frosted. A target upper limit temperature of air blown into the passenger compartment in a cooling mode is generally set at a temperature of 12–15° C. in order to ensure a cooling feeling for the passenger in the passenger compartment, and to prevent bad smell from being generated from the evaporator 8. Accordingly, it is preferable that the cold storage material 11a' has a solidification point between the temperature of the low-pressure refrigerant and the target upper limit temperature of air blown into the passenger compartment. Specifically, paraffin having the solidification point of 6–8° C. is most preferable as the cold storage material 11a'. If the temperature of the low-pressure refrigerant is controlled lower than 0° C., water (ice) can be used as the cold storage material 11a'.

The temperature in the tank body 10 is required to be maintained at a temperature lower than the solidification point of the cold storage material 11a' to maintain the cold storage material 11a' at its cold storage condition (solidification state). Therefore, the tank body 10 is required to be constructed as a heat insulation tank. For example, the tank body 10 is formed by a resin tank having a high heat insulation performance. Alternatively, a heat insulation material is bonded to a surface of a metal tank, so that the tank body 10 is constructed. The cold-storage heat exchanger 11 can be constructed as a shell-tube heat exchanger including a shell and tubes disposed in the shell. In this case, the low-pressure refrigerant is circulated in the tubes, and the cold storage material 11a' is filled outside the tubes in the shell. The cold storage material 11a' is cooled by the low-pressure refrigerant flowing in the tubes.

Next, connection between the cold storage unit 9 and a refrigerant passage in the refrigerant cycle R will be described. As shown in FIG. 1, an inlet pipe 12 is disposed at an upper surface of the tank body 10. The low-temperature and low-pressure refrigerant from the valve body 7a of the expansion valve 7 flows into the inlet pipe 12, and flows from the inlet pipe 12 to an upper portion of the cold-storage heat exchanger 11 in the tank body 10. As shown in FIG. 2, a first check valve 13 is disposed on a lower surface of the cold-storage heat exchanger 11 in the tank body 10. An inlet 13b of the first check valve 13 always communicates with a lower space of the cold-storage heat exchanger 11. When refrigerant pressure is applied to a valve body 13a of the first check valve 13 in a direction from the inlet 13b to an outlet 13c, the valve body 13a is separated from a valve seat 13d, so that the first check valve 13 is opened. On the contrary, when refrigerant pressure is applied to the valve body 13a in a direction from the outlet 13c to the inlet 13b, the valve body 13a press-contacts the valve seat 13d, so that the first check valve 13 is closed. The first check valve 13 has a stopper 13e that is provided for setting a fully opened position of the valve body 13a.

An outlet pipe 14 is disposed at a center in the tank body 10, and extends in an up-down direction while penetrating through a center of the cold-storage heat exchanger 11. An upper end of the outlet pipe 14 penetrates through an upper surface of the tank body 10, and is connected to an inlet of the evaporator 8 as shown in FIG. 1. On the other hand, a lower end of the outlet pipe 14 reaches a liquid-refrigerant storage area in the liquid-refrigerant tank portion 10a, and is connected to an electric pump 15 for circulating the liquid refrigerant. The electric pump 15 includes an suction port 15a at its bottom side, and sucks the liquid refrigerant stored in the liquid-refrigerant tank portion 10 from the suction port 15a. Then, the electric pump 15 supplies the sucked liquid refrigerant to the evaporator 8 through the outlet pipe 14. For example, the electric pump 15 is constructed of a centrifugal type pump including an impeller. The outlet pipe 14 has a connection port 14a at its intermediate portion in the up-down direction, and the outlet 13c of the first check valve 13 is connected to the connection port 14a. Accordingly, a refrigerant passage is formed from the outlet of the valve body 7a of the expansion valve 7 to the inlet of the evaporator 8 through the inlet pipe 12, the cold-storage heat exchanger 11, the first check valve 13 and the outlet pipe 14.

A refrigerant return pipe 16 is provided at the upper surface of the tank body 10. One end (upper end) of the refrigerant return pipe 16 is connected to a refrigerant outlet pipe 17 of the evaporator 8, and the other end (lower end) the refrigerant return pipe 16 is connected to a second check valve 18 that is disposed in the tank body 10 while penetrating through the upper surface of the tank body 10. The refrigerant outlet pipe 17 of the evaporator 8 is connected to the evaporator outlet passage 7b of the expansion valve 7, and the upper end of the refrigerant return pipe 16 is connected to the refrigerant outlet pipe 17 at an upstream side of the evaporator outlet passage 7b. The second check valve 18 is disposed in an uppermost space in the tank body, and an inlet 18b of the second check valve 18 is connected to the other end of the refrigerant return pipe 16. An outlet 18c of the second check valve 18 is disposed to face an upper surface of the cold-storage heat exchanger 11.

The second check valve 18 has a structure similar to the first check valve 13. When refrigerant pressure is applied to a valve body 18*a* of the second check valve 18 in a direction from the inlet 18*b* to the outlet 18*c*, the valve body 18*a* is separated from a valve seat 18*d*, so that the second check valve 18 is opened. On the contrary, when refrigerant pressure is applied to the valve body 18*a* in a direction from the outlet 18*c* to the inlet 18*b*, the valve body 18*a* press-contacts the valve seat 18*d*, so that the second check valve 18 is closed. A stopper 18*e* fixes a fully open position of the valve body 18*a*.

In the first embodiment, the expansion valve 7 is disposed on the upper surface of the tank body 10 of the cold storage unit 9, so that the expansion valve 7 is integrated to the cold storage unit 9. The expansion valve 7 and the cold storage unit 9 are installed in a vehicle as an integrated body. Preferably, in the cold storage unit 9, heat is restricted from entering from the tank body 10 in order to maintain the inside of the tank body 10 at a low temperature state. Therefore, the cold storage unit 9 is disposed in the passenger compartment, for example, inside a dashboard at a front side in the passenger compartment. However, if the cold storage unit 9 cannot be disposed in the passenger compartment due to space restriction, the cold storage unit 9 is disposed in an engine compartment and the like.

Figure 4:
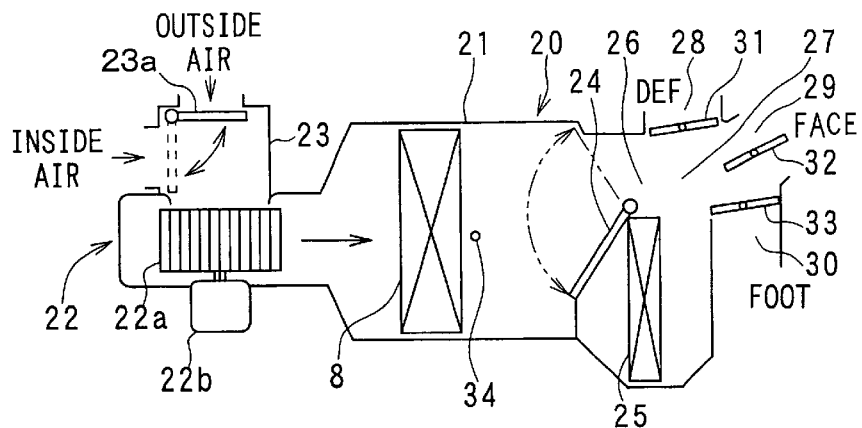
FIG. 4 is a schematic diagram showing an air-conditioning unit of the air conditioner according to the first embodiment.

FIG. 4 shows an interior air conditioning unit 20. The air-conditioning unit 20 is generally disposed inside the dashboard at the front side in the passenger compartment. An air conditioning case 21 of the air-conditioning unit 20 defines an air passage through which air is blown into the passenger compartment, and the evaporator 8 is disposed in the air conditioning case 21. A blower 22 is disposed at an upstream air side of the evaporator 8 in the air conditioning case 21, and has a centrifugal blower fan 22*a* and a drive motor 22*b*. An inside-outside air switching box (switching box) 23 is disposed at a suction side of the blower fan 22*a*. At least one of outside air (i.e., air outside the passenger compartment) and inside air (i.e., air inside the passenger compartment) can be selectively introduced to the switching box 23 by an inside-outside air switching door 23*a* disposed in the switching box 23.

In the air conditioning case 21, an air mixing door 24 is disposed at a downstream air side of the evaporator 8, and a hot-water heater core 25 used as a heating heat exchanger is disposed at a downstream air side of the air mixing door 25. The heater core 25 heats air by using hot water (cooling water) from the vehicle engine 4 as a heat source. A bypass passage 26, through which air (cool air) flows while bypassing the heater core 25, is provided at one side (e.g., upper side) of the heater core 25. The air mixing door 24 is a rotatable plate door, and adjusts a flow ratio between a warm air amount passing through the heater core 25 and a cool air amount passing through the bypass passage 26. An air blowing temperature into the passenger compartment is adjusted by the operation position of the air mixing door 24. The warm air from the heater core 25 and the cool air from the bypass passage 26 are mixed in an air mixing portion 27, so that conditioned air having a desired temperature can be obtained. In the air conditioning case 21, a blow-mode switching portion is provided at a downstream side of the air mixing portion 27. Specifically, a defroster port 28, a face port 29 and a foot port 30 are provided to be opened and closed by mode switching doors 31–33, respectively. Air is blown to an inner surface of a windshield from the defroster port 28, to the upper half body of a passenger in the passenger compartment from the face port 29, and to the foot portion of the passenger from the foot port 30.

A temperature sensor 34 is disposed directly downstream from the evaporator 8, and detects an evaporator blowing temperature Te. Here, the evaporator blowing temperature Te is the temperature of air blown from the evaporator 8. The evaporator blowing temperature Te, detected by the temperature sensor 34, is used for the interruption control of the solenoid clutch 2 of the compressor 1. When the compressor 1 is a variable-displacement compressor, the evaporator blowing temperature Te is used for controlling a displacement of the compressor 1. Cooling capacity of the evaporator 8 is adjusted by the interruption control and the displacement control, thereby adjusting the temperature of air blown from the evaporator 8.

Detection signals from the temperature sensor 34 and a sensor group 35 are input to an air-conditioning control unit 5 for performing air-conditioning control. The sensor group 35 includes plural sensors for detecting an inside air temperature Tr, an outside air temperature Tam, a sunlight amount Ts entering the passenger compartment, a water temperature Tw flowing into the heater core 25 and the like. A switch group (not shown), manually operated by the passenger, is provided on an air-conditioning control panel 36 disposed around the dashboard in the passenger compartment. Operational signals are also input to the air-conditioning control unit 5. The switch group includes a temperature setting switch for setting temperature inside the passenger compartment, an air amount switch for setting an air blowing amount, a blow mode switch for setting an air outlet mode, an inside-outside air introduction switch for setting an inside air introduction mode, an air-conditioning switch for generating an on-off signal of the compressor 1, and the like. The air-conditioning control unit 5 is connected to an engine control unit 37, so that a rotational speed signal of the vehicle engine 4 and a vehicle speed signal are input to the air-conditioning control unit 5 from the engine control unit 37.

The engine control unit 37 totally controls a fuel injection amount to the vehicle engine 4, an ignition time and the like based on signals from a sensor group 38 fro detecting a driving condition of the vehicle engine 4 and the like. Here, the first embodiment is typically applied to the economically running vehicle. Therefore, when the engine control unit 37 determines a stoppage of the vehicle based on the rotational speed signal of the vehicle engine 4, the vehicle speed signal, a brake signal and the like, the engine control unit 37 automatically stops the operation of the vehicle engine 4 by interrupting energization of an ignition device, stopping fuel injection or the like. When the vehicle is changed by manual operation of a driver from a stoppage state to a start state after the operation of the vehicle engine 4 is stopped, the engine control unit 37 determines the start state of the vehicle based on an accelerator signal, and automatically starts the operation of the vehicle engine 4. In addition, when a cold-release cooling mode, in which cooling operation is performed by using the cold-storage heat exchanger 11, is performed for a long time after the operation of the vehicle engine 4 is stopped, the cold-release cooling mode sometimes cannot be maintained. In this case, the air-conditioning control unit 5 outputs an engine re-start requiring signal to the engine control unit 37.

Each of the air-conditioning control unit 5 and the engine control unit 37 includes a microcomputer and its peripheral circuit. The microcomputer is constructed of a central processing unit (CPU), a read only memory (ROM), a random access memory (RAM), and the like. The air-conditioning control unit 5 and the engine control unit 37 may be integrated to each other as a single control unit.

Figure 5:
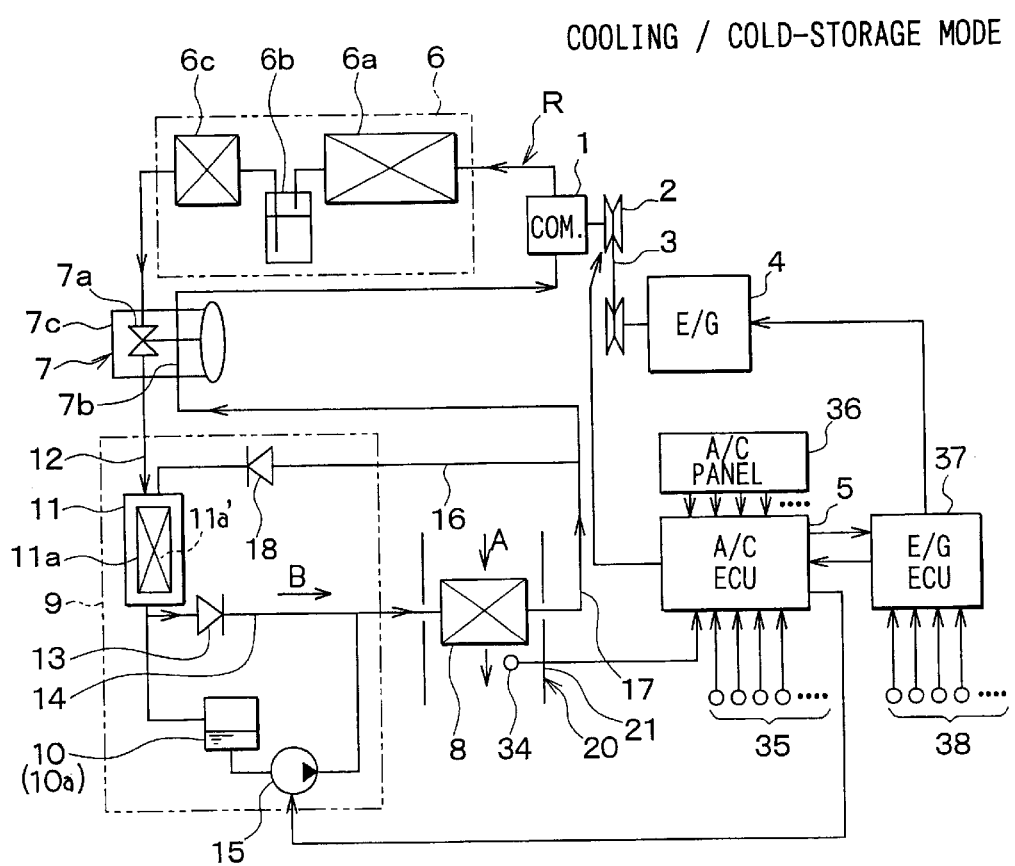
FIG. 5 is a schematic diagram showing the air conditioner having the refrigerant cycle with the cold storage unit, in a normal-cooling and cold storage mode according to the first embodiment.

Next, operation of the vehicle air conditioner according to the first embodiment will be described. FIG. 5 shows a normal-cooling and cold storage mode (i.e., cooling/cold storage mode). In the normal-cooling and cold storage mode shown in FIG. 5, the compressor 1 is driven by the vehicle engine 4, thereby operating the refrigerant cycle R. Therefore, high-pressure gas refrigerant is discharged from the compressor 1, and is cooled by the condenser 6 to be super-cooled liquid refrigerant. The super-cooled liquid refrigerant flows into the expansion valve 7, and is decompressed by the valve body 7a of the expansion valve 7 to be gas-liquid refrigerant having a low temperature and low pressure. The gas-liquid refrigerant flows from the inlet pipe 12 into the tank body 10 of the cold storage unit 9. In the tank portion 10, the gas-liquid refrigerant flows through the clearance portions between the plural cold storage containers 11a from the upper side of the cold-storage heat exchanger 11 to the lower side thereof.

In this case, refrigerant pressure is applied to the valve body 13a of the first check valve 13 disposed on the lower surface of the cold-storage heat exchanger 11 in a forward direction from the inlet 13b to the outlet 13c, so that the first check valve 13 is opened. Thus, the lower space of the cold-storage heat exchanger 11 communicates with the connection port 14a of the outlet pipe 14 through the first check valve 13. In the normal-cooling and cold storage mode, since the operation of the electric pump 15 is not required, the operation of the electric pump 15 is stopped based on an operational signal from the air-conditioning control unit 5. Therefore, the electric pump 15 functions as flow resistance, and only a small amount of refrigerant flows to the lower end of the outlet pipe 14 through the electric pump 15. Accordingly, most of refrigerant in the lower space of the cold-storage heat exchanger 11 flows into the connection port 14a of the outlet pipe 14 through the first check valve 13. At this time, refrigerant pressure is applied to the valve body 18a of the second check valve 18 in a backward direction from the outlet 18c to the inlet 18b, so that the second check valve 18 is closed.

The low-pressure refrigerant introduced into the outlet pipe 14 flows to the inlet of the evaporator 8, and is evaporated in the evaporator 8 by adsorbing heat from blown air in the air conditioning case 21. The evaporated gas refrigerant is sucked into the compressor 1 through the refrigerant outlet pipe 17 of the evaporator 8 and the evaporator outlet passage 7b of the expansion valve 7, and is compressed again in the compressor 1. Cool air, after being heat-exchanged with refrigerant in the evaporator 8, is blown into the passenger compartment through at least the face port 29, thereby cooling the passenger compartment.

Next, in the normal-cooling and cold storage mode, the refrigerant state in the tank body 10 of the cold storage unit 9 will be specifically described. When cooling operation is started at a high temperature of outside air in the summer, the temperature of air to be blown to the evaporator 8 becomes higher than 40° C., so that a cooling load of the evaporator 8 becomes very large. In such a large cooling-load condition, because a super-heating degree of refrigerant at the outlet of the evaporator 8 becomes excessively high, the valve body 7a of the expansion valve 7 is entirely opened, and the pressure of the low-pressure refrigerant increases in the refrigerant cycle R. Therefore, the temperature of the low-pressure refrigerant flowing into the cold-storage heat exchanger 11 of the cold storage unit 9 increases more than the solidification point (e.g., 6–8° C.) of the cold storage material 11a' of the cold-storage heat exchanger 11. Thus, the low-pressure refrigerant absorbs only sensible heat (very small amount of heat) from the cold storage material 11a' in the cold-storage heat exchanger 11, and the cold storage material 11a' is not solidified. As a result, similarly to a normal vehicle air conditioner without the cold-storage heat exchanger 11, the low-pressure refrigerant absorbs heat from blown air in the evaporator 8, and is evaporated.

In the large cooling load, an inside air introduction mode, where inside air is sucked from the switching box 23 shown in FIG. 4, is generally selected, so that the temperature of air introduced to the evaporator 8 reduces as time passes after the cooling operation is performed. Therefore, the open degree of the valve body 7a of the expansion valve 7 reduces. Thus, the pressure of the low-pressure refrigerant in the refrigerant cycle R reduces, and the temperature of the low-pressure refrigerant reduces. Thereafter, when the temperature of the low-pressure refrigerant reduces lower than the solidification point of the cold storage material 11a' of the cold-storage heat exchanger 11, the low-pressure refrigerant absorbs solidification latent heat (very large amount of heat) from the cold storage material 11a'. Therefore, the cold storage material 11a' starts solidification. When the cold storage material 11a' starts solidification, the temperature of the low-pressure refrigerant has already reduced satisfactorily, and the temperature of air to be blown into the passenger compartment has also reduced satisfactorily.

Accordingly, rapid cooling performance (cool down performance) of the air conditioner is not reduced due to the cold storage operation of the solidification latent heat to the cold storage material 11a'. That is, even if the cold-storage heat exchanger 11 is connected to a refrigerant circuit of the cooling evaporator 8 in series, the rapid cooling performance is reduced only by a very small amount in a large cooling-load condition, and the rapid cooling performance can be satisfactorily obtained. When the cooling load reduces and the cold storage material 11a' is solidified, the amount of refrigerant circulating in the refrigerant cycle reduces, and a refrigerant flow speed in the tank body 10 of the cold storage unit 9 reduces. Therefore, the gas-liquid refrigerant is liable to be separated to gas refrigerant and liquid refrigerant in the tank body 10. Thus, the liquid refrigerant falls due to its gravity, and is gradually stored in the liquid-refrigerant tank portion 10a provide at the lower portion in the tank body 10.

FIG. 2 shows a state where the liquid refrigerant stores in maximum in the liquid refrigerant tank portion 10a. As shown in FIG. 2, when a liquid surface of refrigerant increases to the first check valve 13, the liquid refrigerant flows into the evaporator 8 through the first check valve 13, so that the liquid surface does not increase higher than the first check valve 13. That is, the first check valve 13 is used for setting the maximum amount of liquid refrigerant in the liquid-refrigerant tank portion 10a.

Next, a case, where the operation of the vehicle engine 4 is automatically stopped at time of a stoppage of the vehicle such as in waiting for a change of a traffic signal, will be described. Even when the vehicle air conditioner is operated (blower 22 is operated) the vehicle is sopped, the operation of the compressor 1 is enforced to be stopped due to the stoppage of the vehicle engine 4. Therefore, the air-conditioning control unit 5 determines this stoppage of the compressor 1 at the time of a stoppage of the vehicle, and energizes the electric pump 15 in the cold storage unit 9 to operate the electric pump 15. Thus, the electric pump 15 sucks the liquid refrigerant stored in the liquid-refrigerant tank portion 10a, and discharges the liquid refrigerant toward the inlet of the evaporator 8 through the outlet pipe 14. In this case, the refrigerant pressure is applied to the first check valve 13 in the backward direction due to the refrigerant suction operation and the refrigerant discharge operation of the electric pump 15, so that the first check valve 13 is closed. On the contrary, the refrigerant pressure is applied to the second check valve 18 in the forward direction, so that the second check valve 18 is opened.

Figure 6:
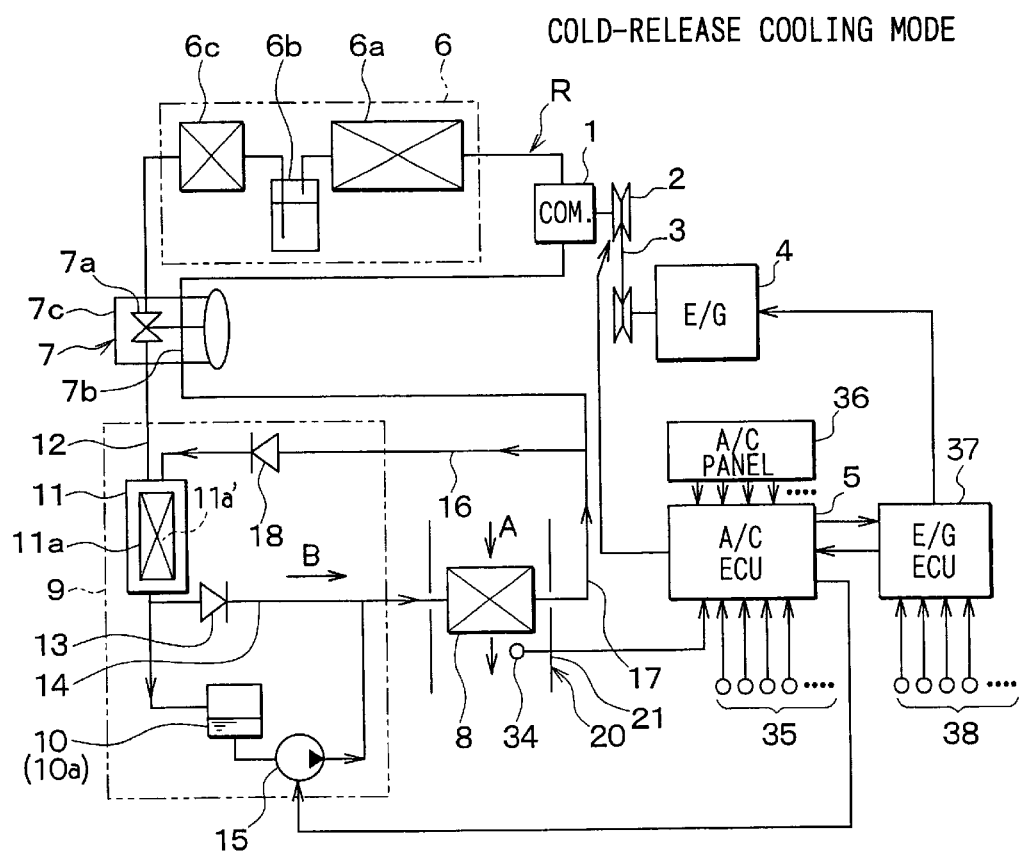
FIG. 6 is a schematic diagram showing the air conditioner having the refrigerant cycle with the cold storage unit, in a cold-release cooling mode according to the first embodiment.

Accordingly, as shown by arrows in FIG. 6, a cold-release cooling mode is set. In the cold-release cooling mode, refrigerant is circulated in a refrigerant circulation circuit from the liquid-refrigerant tank portion 10a to the liquid-refrigerant tank portion 10a through the electric pump 15, the outlet pipe 14, the evaporator 8, the refrigerant outlet pipe 17, the refrigerant return pipe 16, the second check valve 18 and the cold-storage heat exchanger 11 in this order. Therefore, the liquid refrigerant from the liquid-refrigerant tank portion 10a absorbs heat from air blown by the blower 22 to be evaporated, so that cooling operation of the evaporator 8 can be continued, and the passenger compartment can be continuously cooled. Here, the cold storage material 11a' absorbs its dissolution latent heat from the evaporated refrigerant (gas refrigerant) passing through the cold-storage heat exchanger 11, so that the gas refrigerant is cooled and liquefied. The liquefied refrigerant (liquid refrigerant) falls due to its gravity, and is stored in the liquid-refrigerant tank portion 10a.

As described above, liquid refrigerant amount in the liquid-refrigerant tank portion 10a reduces due to the cooling operation of the evaporator 8. On the contrary, since the cold storage material 11a' absorbs its solidification latent heat from the gas refrigerant, the liquid refrigerant amount in the liquid-refrigerant tank portion 10a increases. Therefore, while the liquid refrigerant stays in the liquid-refrigerant tank portion 10a, the cooling operation for the passenger compartment can be continued even when the vehicle (compressor 1) is stopped. A stoppage time of the vehicle in waiting for a change of a traffic signal is generally a short time of 1–2 minutes. If paraffin of approximate 420 grams, having the solidification point of 6–8° C. and solidification latent heat of 229 kilo joules/kilo grams (kJ/kg), is used as the cold storage material 11a', the cooling operation in the passenger compartment can be continued for the stoppage of the vehicle of 1–2 minutes.

Next, operational effects of the vehicle air conditioner according to the first embodiment will be described. If the cold storage tank containing the cold storage material 11a' and the cooling evaporator are connected in parallel, the refrigerant passage of the cold storage tank is required to be opened and closed in accordance with the operation condition of the refrigerant cycle. However, in the first embodiment, since the cold-storage heat exchanger 11 is connected to the cooling evaporator 8 in series in the refrigerant flow direction, all refrigerant circulating in the refrigerant cycle passes through the evaporator 8. Therefore, even in a very large cooling-load condition such as in a case where cooling operation is started in the summer, an amount of refrigerant flowing into the cooling evaporator 8 does not reduce due to the addition of the cold-storage heat exchanger 11.

Further, in the first embodiment, the solidification point of the cold storage material 11a' in the cold-storage heat exchanger 11 is set at a predetermined temperature (e.g., 6–8° C.) that is lower than the target upper-limit temperature (e.g., 12–15° C.) of the air blown into the passenger compartment in the cooling operation. That is, the solidification point of the cold storage material 11a' is set lower than the temperature of the low-pressure refrigerant in the large cooling-load condition. Therefore, in the large cooling-load condition, the low-pressure refrigerant absorbs only sensible heat from the cold storage material 11a', and the cold storage material 11a' is not solidified due to the heat exchange in the cold-storage heat exchanger 11. Thus, similarly to the normal vehicle air conditioner without the cold-storage heat exchanger 11, most of the low-pressure refrigerant absorbs heat from air to be blown into the passenger compartment, and is evaporated in the evaporator 8. That is, in the large cooling-load condition, the maximum cooling capacity of the cooling evaporator 8 can be satisfactorily obtained without performing additional operation for switching a refrigerant flow toward the cold-storage heat exchanger 11.

After the solidification of the cold storage material 11a' in the cold-storage heat exchanger 11 is completed, the cold storage material 11a' substantially does not absorb heat from the low-pressure refrigerant. However, because the cold-storage heat exchanger 11 is disposed at the inlet side of the cooling evaporator 8, the expansion valve 7 detects the super-heating degree of refrigerant at the outlet of the evaporator 8, and can adjust the refrigerant amount flowing in the cold-storage heat exchanger 11 based on the detected super-heating degree. Accordingly, even after the cold storage of the cold storage material 11a' is completed, a suitable flow amount of refrigerant can be supplied to the evaporator 8 in accordance with the cooling load of the evaporator 8. Here, if the cold-storage heat exchanger 11 is disposed at the outlet side of the evaporator 8, refrigerant at the outlet of the evaporator 8 is cooled by the cold storage material 11a', and the super-heating degree is reduced by the cold storage material 11a'. However, in the first embodiment, since the cold-storage heat exchanger 11 is disposed at the inlet of the cooling evaporator 8, the above-described trouble is not generated in the expansion refrigerant cycle. Accordingly, in the first embodiment, a normal cooling function in traveling of the vehicle, the cold storage function, and the cold release function in a stoppage of the vehicle can be satisfactorily performed without using a solenoid valve for switching a refrigerant passage, thereby reducing production cost in the cold-storage type air conditioner.

In the first embodiment, the cold-storage heat exchanger 11 is connected to the inlet side of the evaporator 8 in series, and is disposed in the tank body 10. Further, the liquid-refrigerant tank portion 10a is integrated to the lower portion in the tank body 10 under the cold-storage heat exchanger 11. The low-pressure refrigerant from the expansion valve 7 is heat-exchanged with the cold-storage heat exchanger 11, and is thereafter introduced into the evaporator 8. Therefore, an additional branch pipe is not required between the electric pump 15 and the liquid-refrigerant tank portion 10a. Accordingly, the electric pump 15 can be disposed directly in the liquid refrigerant stored in the liquid-refrigerant tank portion 10a, and the operation of the electric pump 15 can be started while its suction side is filled with liquid refrigerant, thereby preventing the electric pump 15 from idling. Further, in the first embodiment, because the cold-storage heat exchanger 11, the liquid refrigerant tank portion 10a and the electric pump 15 are integrated in the single tank body 10, the size of the cold storage unit 9 can be made small, and the cold-storage heat exchanger 9 is readily mounted in the vehicle.

Further, in the normal-cooling and cold storage mode during the traveling of the vehicle, refrigerant at the lower side of the cold-storage heat exchanger 11 is introduced to the inlet side of the evaporator 8 through the outlet pipe 14. Therefore, in the normal-cooling and cold storage mode, the low-pressure refrigerant can flow smoothly in the cold-storage heat exchanger 11 from an upper portion to a lower portion in the gravitational direction, and can be smoothly introduced to the inlet side of the evaporator 8 through the first check valve 13 and the outlet pipe 14.

Since the liquid-refrigerant tank portion 10a is disposed at the lower side of the cold-storage heat exchanger 11 in the cold storage unit 9, refrigerant condensed in the cold-storage heat exchanger 11 rapidly falls into the liquid-refrigerant tank portion 10a due to its gravity. Therefore, the surface of the cold storage container 11a does not stay in the condensed refrigerant (liquid refrigerant), and a heat transmission area between gas refrigerant and the cold storage containers 11a can be always ensured. Thus, the heat exchange in the cold-storage heat exchanger 11 can be effectively performed between the gas refrigerant and the cold storage containers 11a, condensation performance for condensing gas refrigerant in the cold-storage heat exchange 11 can be satisfactorily maintained. Accordingly, in the cold-release cooling mode, the amount of liquid refrigerant supplied to the evaporator 8 can be sufficiently obtained, and cold-release cooling performance can be effectively ensured.

Further, in the first embodiment, it is unnecessary to arrange the cold-storage heat exchanger 11 above the evaporator 8 in order to prevent the surface of the cold storage container 11a from being drenched in the liquid refrigerant. Therefore, the cold storage unit 9 can be readily mounted in the vehicle, and the layout of the cold-storage air conditioner can be made simple.

Second Embodiment

In the above-described first embodiment, the expansion valve 7 is used as a decompression device, and the superheating degree of refrigerant at the outlet of the evaporator 8 is adjusted by the expansion valve 7. However, in the second embodiment, the cold-storage heat exchanger 11 is used for an accumulator refrigerant cycle. In the accumulator refrigerant cycle, a refrigerant accumulator is disposed at the outlet side of the evaporator 8, that is, at the suction side of the compressor 1. In the accumulator refrigerant cycle, refrigerant from the outlet of the evaporator 8 is separated by the accumulator into gas refrigerant and liquid refrigerant, and the liquid refrigerant is stored in the accumulator. The gas refrigerant in the accumulator is sucked into the compressor 1. In the second embodiment, the components similar to those in the first embodiment are indicated by the same reference numerals, and description -thereof is omitted. Further, the electronic control portion such as the control units 5, 37 described in the first embodiment are omitted in FIGS. 7–10, for simply showing the figures.

In the accumulator refrigerant cycle, since the tank-shaped accumulator is disposed at the outlet side of the evaporator 8, the accumulator is integrated to the cold storage unit 9 in the second embodiment. Specifically, as shown in FIG. 8, an inlet pipe 120 is provided on the upper surface of the tank body 10 of the cold storage unit 9. Through the inlet pipe 120, refrigerant at the outlet of the evaporator 8 flows into the upper portion of the tank body 10. The liquid-refrigerant tank portion 10a is provided at the lower portion in the tank body 10. Further, the cold-storage heat exchanger 11 disposed at the upper side in the tank body 19 is similar to that in the first embodiment.

First and second outlet pipes 141, 142 are disposed in the tank body 10, and the first outlet pipe 141 corresponds to an outlet pipe of a normal accumulator. Therefore, the first outlet pipe 141 is bent in a U-shape, and has an oil return hole 141a at its bottom portion. A lubrication oil contained in refrigerant is sucked from the oil return hole 141a, and is introduced into the compressor 1 through the first outlet pipe 14. The first outlet pipe 141a has a gas refrigerant inlet 141b at its one end which is located higher than the liquid surface of liquid refrigerant stored in the liquid-refrigerant tank portion 10a. Therefore, gas refrigerant at the upper portion of the tank body 10 is sucked into the first outlet pipe 141 from the gas refrigerant inlet 141b. The other end of the first outlet pipe 141 is taken out from the upper surface of the tank body 10, and is connected to the suction side of the compressor 1. Further, a desiccant unit 141c, containing a desiccant for absorbing water, is disposed in the first outlet pipe 141 at a position downstream from the gas refrigerant inlet 141b.

On the other hand, the second outlet pipe 142 forms a refrigerant circulation passage in the cold-release cooling mode at a stoppage of the vehicle, and its lower end (one end) is located in liquid refrigerant stored in the liquid-refrigerant tank portion 10a. The electric pump 15 is disposed at the bottom end of the second outlet pipe 142, and has a suction port 15a at its lower end. The electric pump 15 sucks liquid refrigerant from the suction port 15a, and discharges the sucked liquid refrigerant into the second outlet pipe 142. The other end of the second outlet pipe 142 is also taken out from the upper surface of the tank body 10, and the check valve 18 is disposed on the upper surface of the tank body 10. The other end of the second outlet pipe 142 is connected to an inlet pipe 143 of the evaporator 8 through the check valve 18. The inlet pipe 143 connects an outlet side of a decompression device 70 and the inlet side of the evaporator 8.

The check valve 18 has a structure similar to the second check valve 18 of FIG. 2 described in the first embodiment. When the refrigerant pressure applied to the valve body 18a in the direction from the inlet 18b to the outlet 18c, the valve body 18a is separated from the valve seat 18d, and the check valve 18 is opened. FIG. 8 shows the opened state of the check valve 18. On the contrary, when the refrigerant pressure is applied to the valve body 18a in the direction from the outlet 18c to the inlet 18b, the valve body 18a press-contacts the valve seat 18d, and the check valve 18 is closed. A plate member 142a is attached to the second outlet pipe 142 between an upper side of the gas refrigerant inlet 141b and a lower side of the cold-storage heat exchanger 11. The plate member 142a prevents refrigerant flowing in the cold-storage heat exchanger 11 from colliding with liquid refrigerant around the gas refrigerant inlet 141b. Therefore, the separated gas refrigerant can be effectively returned to the suction side of the compressor 1 while it can restrict the liquid surface of the liquid refrigerant from being disturbed due to the refrigerant collision.

In the second embodiment, refrigerant is separated into gas refrigerant and liquid refrigerant in the tank body 10, and the liquid refrigerant is stored in the tank body 10. That is, the tank body 10 has the function of an accumulator tank. The gas refrigerant in the tank body 10 is circulated into the suction side of the compressor 1 from the gas refrigerant inlet 141b of the first outlet pipe 141. Accordingly, it can prevent the compressor 1 from compressing liquid refrigerant even when the super-heating degree of refrigerant at the outlet of the evaporator 8 is not adjusted. Therefore, in the second embodiment, a fixed throttle such as a capillary tube and an orifice, or a variable throttle that is changeable in response to high-pressure refrigerant can be used as the decompression device 70. The structure of the decompression device 70 is simple, and the production cost thereof can be reduced as compared with the thermal expansion valve 7 described in the first embodiment.

FIG. 9 shows the normal-cooling and cold storage mode (cooling/cold storage mode) in the traveling of the vehicle according to the second embodiment. In this case, the compressor 1 is driven by the vehicle engine 4, and refrigerant is circulated in a refrigerant circuit, indicated by the arrows in FIG. 9, from the discharge side of the compressor 1 to the suction side of the compressor 1, through the condenser 6, the decompression device 70, the inlet pipe 143, the evaporator 8, the inlet pipe 120, the cold-storage heat exchanger 11 and the first outlet pipe 141, in this order. Thus, in the evaporator 8, the low-pressure refrigerant absorbs heat from air flowing in the air conditioning case 21, and is evaporated. Thereafter, air passing through the evaporator 8 is cooled, and the passenger compartment can be cooled by the blown air. In the cold-storage heat exchanger 11, the cold storage material 11a' is cooled and solidified by the low-pressure refrigerant, so that cold storage is performed in the cold storage material 11a'. In the normal-cooling and clod-storage mode, the operation of the electric pump 15 is stopped as in the first embodiment, and the check valve 18 is closed.

FIG. 10 shows the cold-release cooling mode at a stoppage of the vehicle according to the second embodiment. In this case, the electric pump 15 is operated, and refrigerant is circulated in a refrigerant circuit indicated by the arrows in FIG. 10. Specifically, the liquid refrigerant in the liquid-refrigerant tank portion 10a is sucked and discharged by the electric pump 15, and refrigerant is circulated in the refrigerant circuit from the electric pump 15 to the liquid-refrigerant tank portion 10a, through the second outlet pipe 142, the check valve 18 (opened), the inlet pipe 143, the evaporator 8, the inlet pipe 120 and the cold-storage heat exchanger 11 in this order. Therefore, refrigerant evaporated by the evaporator 8 can be cooled and liquefied by the cold-storage heat exchanger 11 while the liquid refrigerant stored in the liquid-refrigerant tank portion 10a is circulated into the evaporator 8. Accordingly, in the second embodiment, the cold-release cooling function at a stoppage of the vehicle can be satisfactorily exhibited.

In the second embodiment, the cold-storage heat exchanger 11 is connected to the outlet side of the evaporator 8 in series in the accumulator refrigerant cycle. In the accumulator refrigerant cycle, a fixed throttle such as a capillary tube and an orifice, or a variable throttle can be used as the decompression device 70. Further, even if the cold-storage heat exchanger 11 is connected to the outlet side of the evaporator 8 in series, it is unnecessary to adjust the super-heating degree of refrigerant at the outlet of the evaporator 8.

Since a pressure loss is necessarily generated in refrigerant flowing through a refrigerant passage in the evaporator 8, refrigerant pressure (evaporation pressure) reduces at the outlet side of the evaporator 8 than that at the inlet side thereof. Further, in the tank body 10 (accumulator portion), the liquid surface of refrigerant is formed, and the refrigerant is in a saturated vapor-pressure state. Therefore, the refrigerant within the tank body 10 does not reach to the super-heated state, and the refrigerant temperature (evaporation temperature) reduces at the outlet side of the evaporator 8 than that at the inlet side thereof, due to the refrigerant pressure reduction. In the second embodiment, in the accumulator refrigerant cycle, the cold-storage heat exchanger 11 is connected to the outlet side of the evaporator 8 in series. Therefore, the cold storage material 11a' can be cooled by lower-temperature refrigerant, and heat-exchange efficiency between the cold storage material 11a' and the refrigerant can be improved. Further, the solidification of the cold storage material 11a' can be completed for a short time.

Third Embodiment

Figure 7:
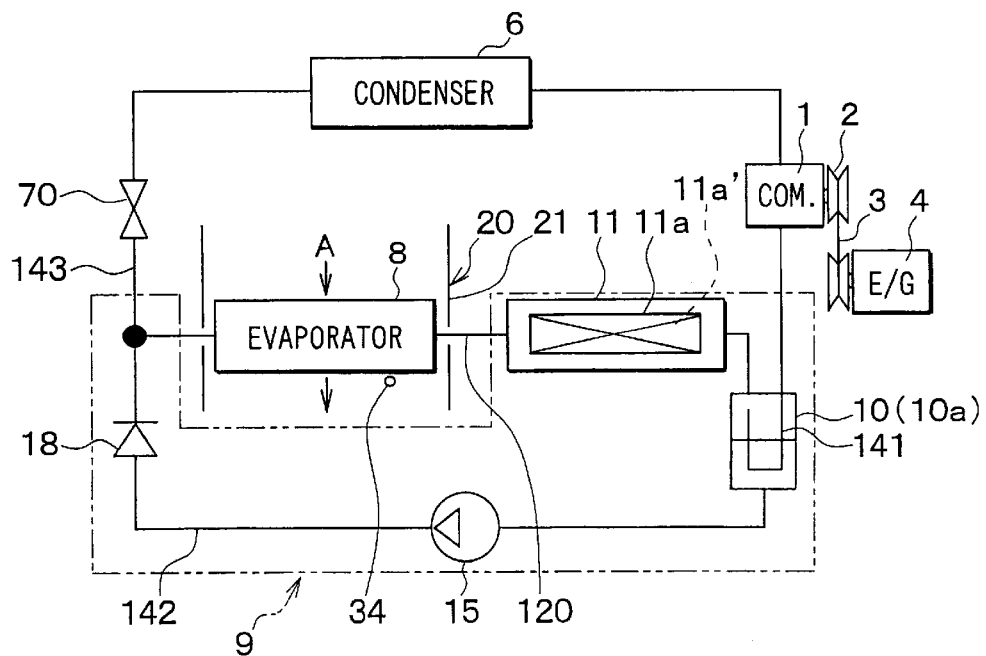
FIG. 7 is a schematic diagram showing a refrigerant cycle with a cold storage unit, according to a second embodiment of the present invention.
Figure 11:
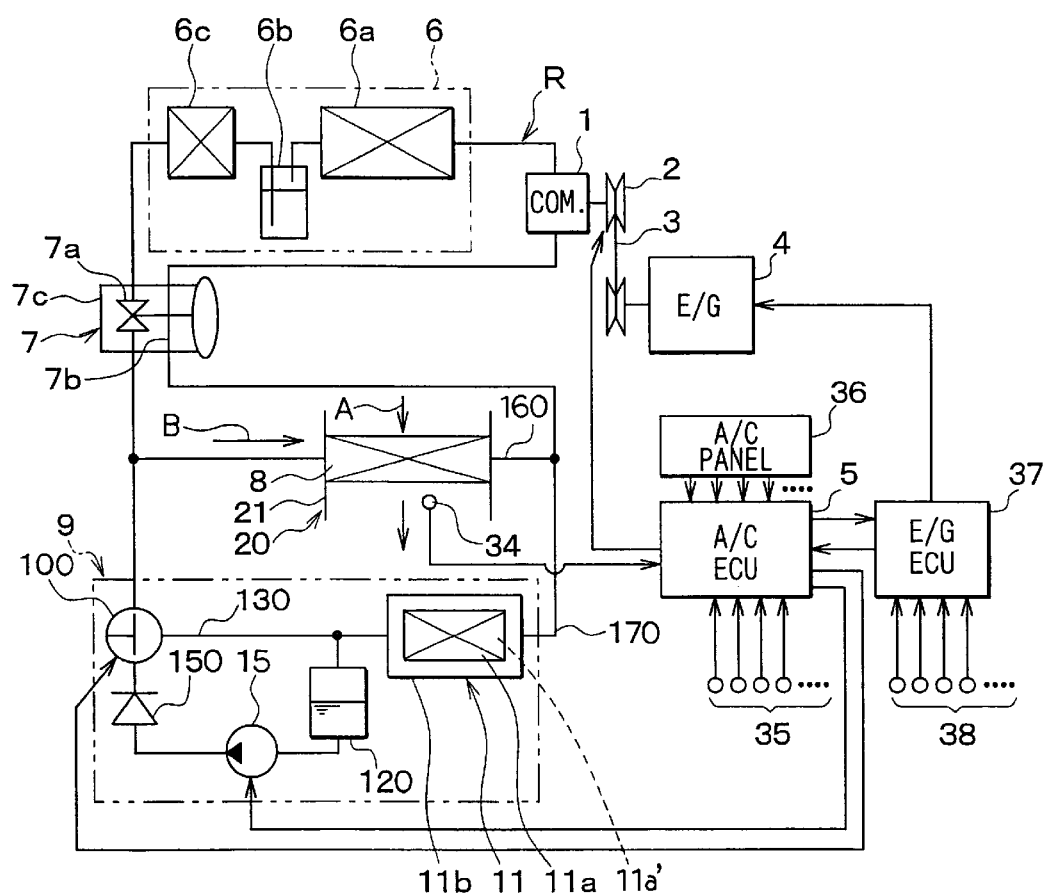
FIG. 11 a schematic diagram showing an air conditioner having a refrigerant cycle with a cold storage unit, according to a third embodiment of the present invention.

In the above embodiments, as shown in FIGS. 1, 7, the cold-storage heat exchanger 11 and the evaporator 8 are connected in series in the refrigerant flow direction. However, in the third embodiment, as shown in FIG. 11, the cold-storage heat exchanger 11 and the evaporator 8 are connected in parallel, in the refrigerant flow direction. In the third embodiment, the components similar to the above embodiments are indicated by the same reference numerals, and description thereof is omitted.

In the third embodiment, the cold storage unit 9 is integrally constructed with apparatuses enclosed by two-dot chain lines in FIG. 11. Further, the outlet passage of the valve body 7a of the thermal expansion valve 7 is connected to the cold-storage heat exchanger 11 through a passage switching valve 100. The cold-storage heat exchanger 11 is constructed of the plural cold storage containers 11a and a tank member 11b (tank body) in which the plural cold storage containers 11a are disposed. The cold-storage heat exchanger 11 has a structure similar to that in the above-described first embodiment.

The temperature in the tank member 11b is required to be maintained at a temperature lower than the solidification point of the cold storage material 11a' for maintaining the cold storage material 11a' at its cold storage condition (solidification state). Generally, the tank member 11b is constructed as a heat insulation tank. For example, the tank member 11b is a resin tank having high heat insulation performance. Alternatively, a heat insulation material is bonded to a metal tank, so that the tank member 11 is formed. The cold-storage heat exchanger 11 can be constructed as a shell-tube heat exchanger including a shell and tubes disposed in the shell (tank member 11b). The low-pressure refrigerant is circulated in the tubes, and the cold storage material 11a' is filled outside the tubes in the shell. The cold storage material 11a' is cooled by the low-pressure refrigerant flowing in the tubes.

Figure 13:
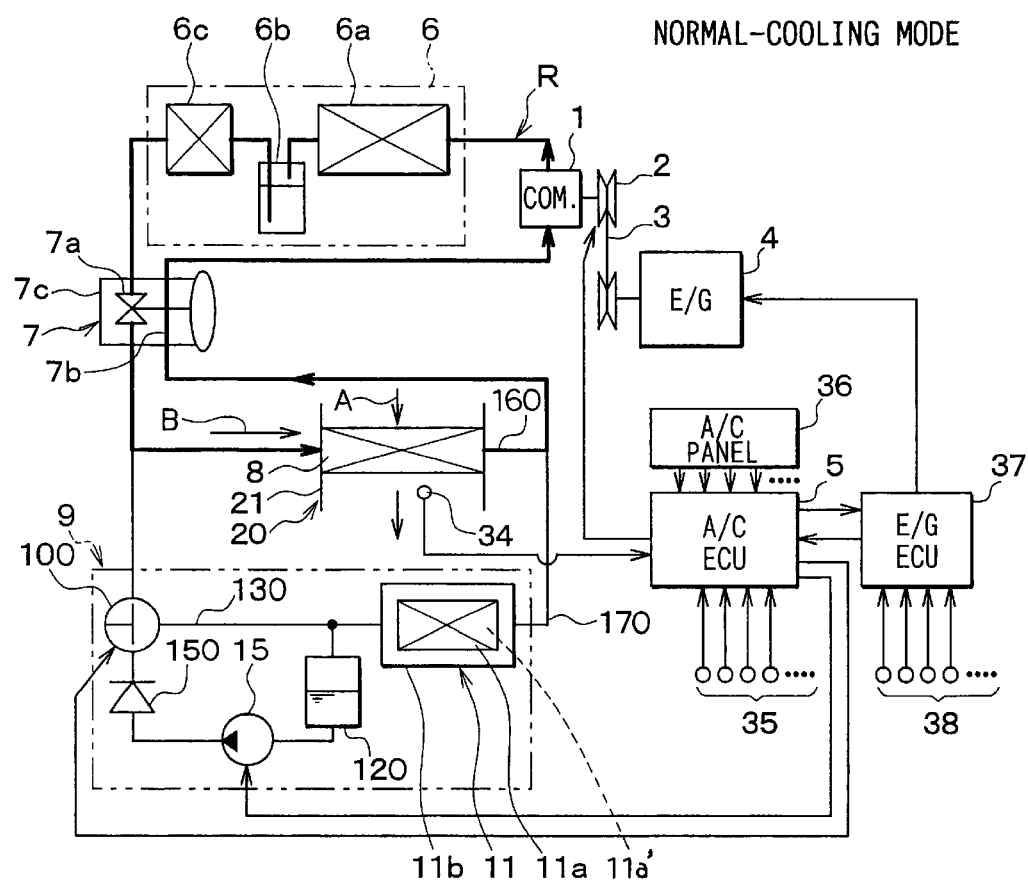
FIG. 13 is a schematic diagram showing the refrigerant cycle with the cold storage unit in a normal cooling mode, according to the third embodiment.
Figure 14:
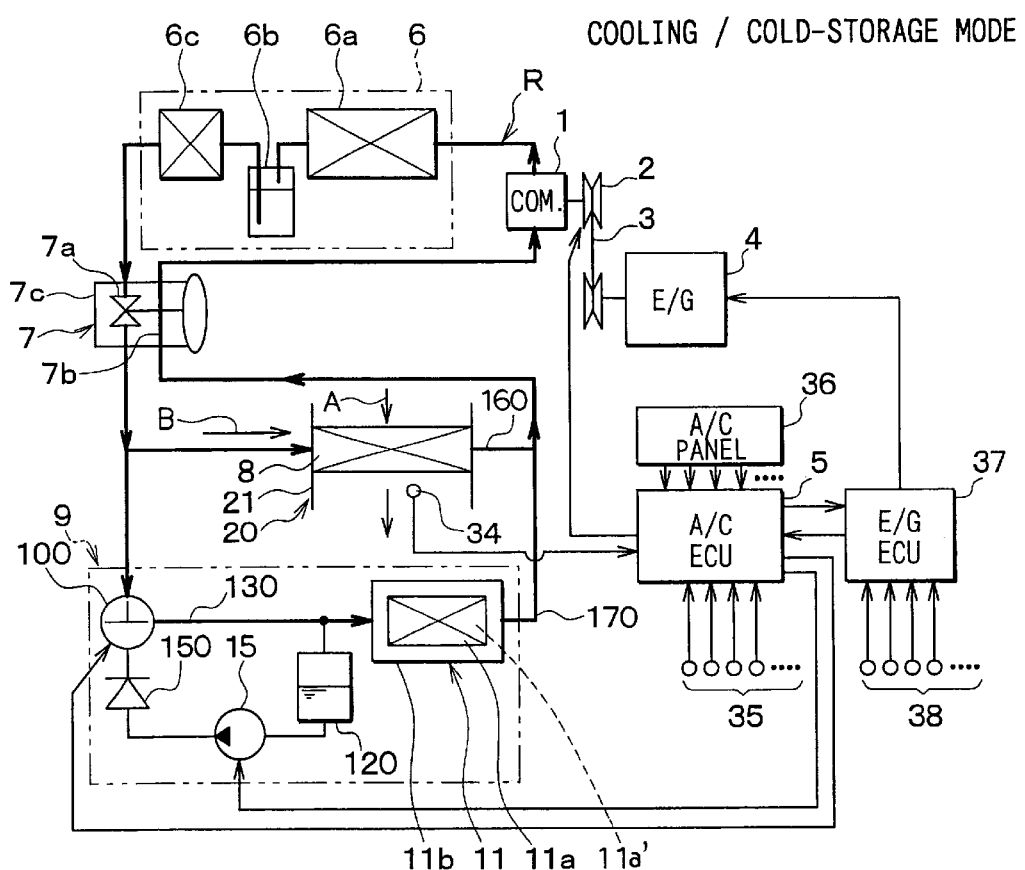
FIG. 14 is a schematic diagram showing the refrigerant cycle with the cold storage unit in a cold-storage cooling mode, according to the third embodiment.
Figure 15:
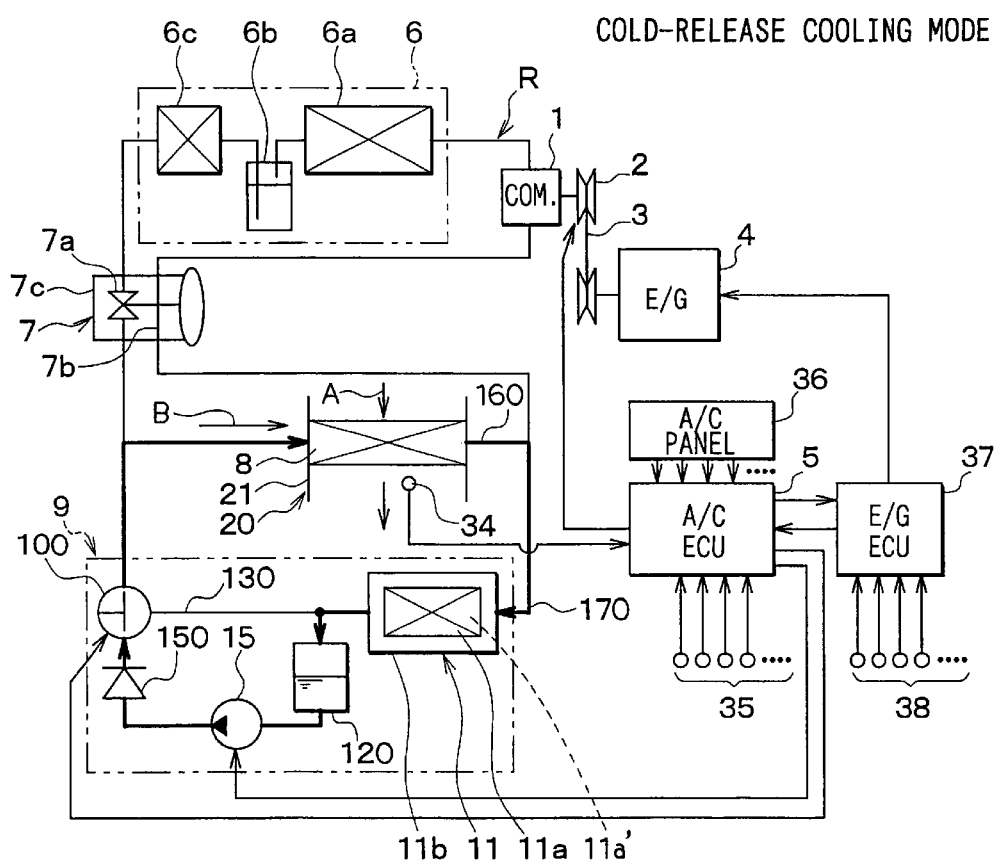
FIG. 15 is a schematic diagram showing the refrigerant cycle with the cold storage unit in the cold-release cooling mode according to the third embodiment.

In the cold storage unit 9, a liquid-refrigerant tank portion 120 (corresponding to the liquid-refrigerant tank portion 11a shown in FIG. 2) is disposed below the cold-storage heat exchanger 11. Here, the liquid-refrigerant tank portion 120 can be integrated to the lower portion of the tank member 11b of the cold-storage heat exchanger 11. A top end of the liquid-refrigerant tank portion 120 is connected to a refrigerant passage 130 for connecting the passage switching valve 100 and the cold-storage heat exchanger 11. A lower end (bottom end) of the liquid-refrigerant tank portion 120 is connected to the electric pump 15. In the cold-release cooling mode, liquid refrigerant in the liquid-refrigerant tank portion 120 is sucked by the electric pump 15, flows through a check valve 150, the passage switching valve 100, the evaporator 8 and the cold-storage heat exchanger 11 in this order, and thereafter flows into the liquid-refrigerant tank portion 120. That is, as described later, in both of the normal-cooling and cold storage mode and the cold-release cooling mode, refrigerant passes through the evaporator 8 in the same direction indicated by the arrow B in FIG. 1. The passage switching valve 100 is an electric control valve including a rotary valve body. The rotational angle of the rotary valve body of the passage switching valve 100 is controlled by an actuator such as a servomotor, so that the passage switching valve 100 can be used as a three-way valve. As shown in FIGS. 13–15 as described later, the outlet passage of the thermal expansion valve 7 is switched by the passage switching valve 100 to be connected to one of the refrigerant passage 130 at an inlet side of the cold-storage heat exchanger 11 and a refrigerant passage at a side of the check valve 150.

Figure 12:
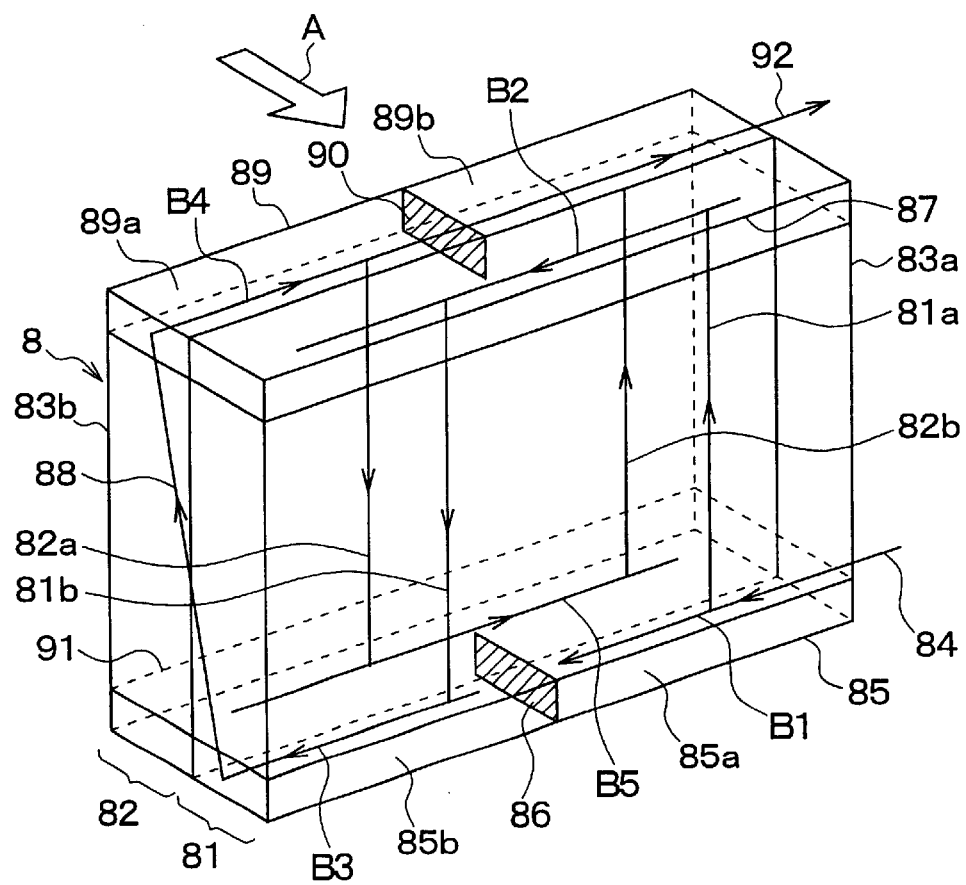
FIG. 12 is a schematic diagram showing an evaporator used for the refrigerant cycle of the third embodiment.

An outlet refrigerant passage 160 of the evaporator 8 is connected to the evaporator outlet passage 7b of the expansion valve 7, and to a refrigerant passage 170 of the cold-storage heat exchanger 11. The refrigerant passage 170 is used as an outlet refrigerant passage of the cold-storage heat exchanger 11 when the compressor 1 is operated, and is used as an inlet refrigerant passage thereof when the operation of the compressor 1 is stopped. As shown in FIG. 12, a refrigerant passage in the evaporator 8 is constructed as an orthogonal-opposite flow type passage to improve its heat-exchange efficiency. Specifically, the evaporator 8 includes an inlet heat exchange portion 81, and an outlet heat-exchange portion 82 disposed upstream from the inlet heat exchange portion 81, in an air flow direction A. The inlet heat-exchange portion 81 includes a refrigerant inlet 84 at one side portion 83a (right side) of the evaporator 8, and refrigerant flows into a right space 85a from the refrigerant inlet 84 as indicated by an arrow B1. Here, an inner space of a lower tank portion 85 is partitioned by a partition plate 86 into the right space 85a and a left space 85b.

The refrigerant flows upwardly in a right passage 81a of the inlet heat-exchange portion 81 from the right space 85a of the lower tank portion 85, and reaches an upper tank portion 87. Since a partition plate is not provided in the upper tank portion 87, the refrigerant flows to a left side in the upper tank portion 87 as indicated by an arrow B2. Then, the refrigerant flows downwardly in a left passage 81b of the inlet heat-exchange portion 81, and reaches the left space 85b of the lower tank portion 85. The refrigerant flows to a left side in the left space 85b as indicated by an arrow B3. A side passage 88 is provided on the other side portion 83b (left side), and communicates with a left end of the lower tank portion 85. An upper end of the side passage 88 communicates with a left space 89a of an upper tank portion 89 of the outlet heat-exchange portion 82. Therefore, the refrigerant passing through the side passage 88 flows into the left space 89a. Then, the refrigerant flows to a right side in the left space 89a as indicated by an arrow B4.

Here, an inner space of the upper tank 89 is partitioned by a partition plate 90 into the left space 89a and a right space 89b. Therefore, the refrigerant in the left space 89a flows downwardly in a left passage 82a of the outlet heat-exchange portion 82, and flows into a lower tank portion 91. Since a partition plate is not provided in the lower tank portion 91, the refrigerant flows to a right side in the lower tank portion 91 as indicated by an arrow B5. The refrigerant flows upwardly in a right passage 82b of the outlet heat-exchange portion 82 from a right area of the lower tank portion 91, and reaches a right space 89b of the upper tank portion 89. Since the right space 89b of the upper tank portion 89 communicates with a refrigerant outlet 92 disposed on the one side portion 83a, the refrigerant in the right space 89b flows outside of the evaporator 8 from the refrigerant outlet 92.

Each of the refrigerant passages 81a, 81b, 82a, 82b, schematically shown in the drawing, is constructed of plural metal (e.g., aluminum) tubes disposed in parallel. Thus, in a refrigerant passage structure shown in FIG. 12, air flows in a direction A perpendicular to the refrigerant flow direction in the evaporator 8, thereby forming the orthogonal-flow type passage. Further, the inlet heat-exchange portion 81 is disposed downstream from the outlet heat-exchange portion 82 in the air flow direction A. Further, in the third embodiment, a flow sectional area of the refrigerant passages 82a, 82b of the outlet heat-exchange portion 82 is made larger than that of the refrigerant passages 81a, 81b of the inlet heat-exchange portion 81. Accordingly, in the refrigerant passages 82a, 82b at the refrigerant outlet side of the evaporator 8, a ratio (i.e., dryness) of gas refrigerant to liquid refrigerant increases, thereby reducing a pressure loss.

Next, operation of the vehicle air conditioner according to the third embodiment will be described. In the normal cooling mode, as shown in FIG. 13, the passage switching valve 100, controlled by the air-conditioning control unit 5, closes a refrigerant passage between the outlet passage of the expansion valve 7 and the cold-storage heat exchanger 11, and opens a refrigerant passage between the outlet passage of the expansion valve 7 and a refrigerant passage of the electric pump 15. At this time, the check valve 150 prevents refrigerant from flowing toward the electric pump 15. Therefore, all the low-pressure refrigerant, having passed through the expansion valve 7, flows into the evaporator 8 as indicated by bold-line arrows shown in FIG. 13. In the evaporator 8, the low-pressure refrigerant from the expansion valve 7 absorbs heat from air flowing in the air conditioning case 21, and is evaporated. The evaporated refrigerant (gas refrigerant) is sucked into the compressor 1 through the outlet passage 160 of the evaporator 8 and the evaporator outlet passage 7b of the expansion valve 7, and is again compressed in the compressor 1. The cool air, after passing through the evaporator 8, is blown into the passenger compartment, so that the passenger compartment is cooled.

If the cooling load required in the evaporator 8 reduces lower than a predetermined level when the vehicle travels, its cooling capacity becomes larger than a desired level. Further, while a vehicle speed is reduced, the compressor 1 can be driven by inertia motive power of the vehicle. In these cases, the motive power, from the vehicle engine 4, for driving the compressor 1 can be saved. When the air-conditioning control unit 5 determines this condition, the operation mode is switched from the normal cooling mode to the cooling and cold storage mode. For example, when the evaporator blowing temperature Te reduces lower than a predetermined temperature, the air-conditioning control unit 5 determines that the cooling load reduces lower than the predetermined level. Further, it can be determined that the vehicle speed reduces based on the vehicle speed signal from the engine control unit 37.

In the cooling and cold storage mode (cooling/cold storage mode), as shown in FIG. 14, the passage switching valve 100 opens the refrigerant passage between the outlet passage of the expansion valve 7 and the cold-storage heat exchanger 11. Therefore, the refrigerant, having passed through the expansion valve 7, flows into the evaporator 8 and the cold-storage heat exchanger 11 in parallel in the refrigerant flow direction, as indicated by bold-line arrows shown in FIG. 14. Accordingly, in the evaporator 8, the low-pressure refrigerant absorbs heat from air in the air conditioning case 21, and is evaporated. On the other hand, the cool air, having passed through the evaporator 8, is blown into the passenger compartment from at least the face port 29. At the same time, the cold-storage of the cold storage material 11a' in the cold-storage heat exchanger 11 is performed.

Specifically, when the cooling load of the evaporator 8 reduces, an open degree of the valve body of the expansion valve 7 reduces, and the pressure of the low-pressure refrigerant in the refrigerant cycle reduces. Then, the temperature of the low-pressure refrigerant reduces lower than the solidification point of the cold storage material 11a', solidification of the cold storage material 11a' starts due to evaporation of the low-pressure refrigerant, and the cold storage is performed in the cold storage material 11a' as the solidification latent heat. On the other hand, the gas refrigerant evaporated in the evaporator 8 and the cold-storage heat exchanger 11 is sucked into the compressor 1 through the outlet passage 160 of the evaporator 8 and the evaporator outlet passage 7b in the expansion valve 7, and is again compressed in the compressor 1. Here, the liquid-refrigerant tank portion 120 is disposed under the refrigerant passage 130 of the cold-storage heat exchanger 11. Therefore, refrigerant flowing into the cold-storage heat exchanger 11 from the refrigerant passage 130 is separated into gas refrigerant and liquid refrigerant, due to a mass density difference between the liquid refrigerant and the gas refrigerant. Then, the separated liquid refrigerant is stored in the liquid-refrigerant tank portion 120.

Next, a case where the operation of the vehicle engine 4 is automatically stopped at a time of a stoppage of the vehicle such as in waiting for a change of a traffic signal, will be described. Even if the vehicle air conditioner (blower 22) is operated at the time of a stoppage of the vehicle, the operation of the compressor 1 is enforced to be stopped due to the stoppage of the vehicle engine 4. Therefore, the air-conditioning control unit 5 determines this operation stoppage of the vehicle engine 4 (compressor 1). Further, as shown in FIG. 15, the passage switching valve 100 is switched by an output control signal from the air-conditioning control unit 5 to the state in the normal cooling mode. Specifically, the passage switching valve 100 closes the refrigerant passage between the outlet passage of the expansion valve 7 and the cold-storage heat exchanger 11, and opens the refrigerant passage between the outlet passage of the expansion valve 7 and the electric pump 15. Further, the electric pump 15 is energized and operated by the output control signal from the air-conditioning control unit 5.

Thus, as indicated by bold-line arrows in FIG. 15, refrigerant circulates from the liquid-refrigerant tank portion 120 to the liquid-refrigerant tank portion 120, through the electric pump 15, the check valve 150, the passage switching valve 100, the evaporator 8 and the refrigerant passage 160, 170, in this order. Therefore, the liquid refrigerant stored in the liquid-refrigerant tank portion 120 is introduced to the evaporator 8, and is evaporated by absorbing heat from air blown by the blower 22. Therefore, even when the operation of the compressor 1 is stopped, the cooling operation for the evaporator 8 can be continued, the cooling operation for the passenger compartment can be continued. The evaporated refrigerant (gas refrigerant) from the evaporator 8 has a temperature higher than the solidification point of the cold storage material 11a' of the cold-storage heat exchanger 11. Therefore, the cold storage material 11a' absorbs its dissolution latent heat from the gas refrigerant, and is changed from the solid phase to the liquid phase (dissolved). At this time, the gas refrigerant is cooled by the cold storage material 11a', and is liquefied. The liquid refrigerant falls from the cold-storage heat exchanger 11 due to its gravity, and is stored in the liquid-refrigerant tank portion 120.

Since the cold storage material 11a' gradually changes its phase, an mount of the liquid refrigerant stored in the liquid-refrigerant tank portion 120 reduces gradually. However, while the liquid refrigerant remains in the liquid-refrigerant tank portion 120, the cooling operation in the passenger compartment at the stoppage of the vehicle (compressor 1) can be continued.

Also in the third embodiment shown in FIGS. 13–15, as in the above embodiments shown in FIGS. 5, 6, 9, 10, the refrigerant flow direction in the evaporator 8 is the same direction B in any one of the normal cooling mode, the cooling and cold storage mode and the cold-release cooling mode. The direction B is from the outlet pipe 14 to the refrigerant outlet pipe 17 in the first embodiment, and is from the inlet pipe 143 to the inlet pipe 120 in the second direction. In the third embodiment, the direction B is from the outlet passage of the expansion valve 7 to the outlet passage 160. Accordingly, in the first to third embodiments, the heat-exchange performance of the evaporator 8 can be effectively improved in the cold-release cooling mode where the operation of the compressor 1 is stopped.

Next, this operational effect according to the third embodiment will be specifically described. In the refrigerant cycle R, the thermal expansion valve 7 is used as a decompression device, and a refrigerant amount circulated in the refrigerant cycle R is adjusted by the thermal expansion valve 7 so that the refrigerant at the outlet of the evaporator 8 has a predetermined super-heating degree. Therefore, a super-heating area of refrigerant is provided in an outlet area of the evaporator 8, and a refrigerant temperature in the outlet area of the evaporator 8 is higher than that in an inlet area of the evaporator 8. Accordingly, the opposite-flow type passage is provided in the evaporator 8 in the air flow direction A as shown in FIG. 12, so that a temperature difference between air and refrigerant can be made larger in both of the inlet and outlet heat-exchange portions 81, 82, and the heat-exchange performance of the evaporator 8 can be improved.

In the refrigerant passage of the evaporator 8 from the inlet side to the outlet side, the refrigerant gradually evaporated, and the ratio (dryness) of gas refrigerant to liquid refrigerant increases. Therefore, at the outlet side, a pressure loss due to a flow speed increase of refrigerant is obviously increased. However, in the third embodiment, the passage sectional area in the refrigerant passages 82a, 82b of the outlet heat-exchange portion 82 is set larger than that in the refrigerant passages 81a, 81b of the inlet heat-exchange portion 81, thereby restricting this pressure loss increase. Here, the refrigerant flows through the evaporator 8 in the same direction B in all of the above cooling modes. Therefore, in all the cooling modes, the heat-exchange performance of the evaporator 8 can be effectively improved by the opposite-flow type passage, and the pressure loss increase in the refrigerant passages 82a, 82b can be restricted.

If the flow direction of refrigerant in the evaporator 8 is different between the cooling and cold storage mode and the cold release mode, refrigerant may flow through a pump mechanism of the electric pump 15 in a backward direction, and refrigerant may be excessively restricted by the pump mechanism from flowing to the cold-storage heat exchanger 11. As a result, a refrigerant amount flowing to the cold-storage heat exchanger 11 reduces. However, according to the third embodiments, in the cooling and cold storage mode, refrigerant flows into the cold-storage heat exchanger 11 from the passage switching valve 100 through the refrigerant passage 130 while bypassing the electric pump 15. Therefore, a refrigerant flow amount to the cold-storage heat exchanger 11 does not reduce by the electric pump 15. Here, the check valve 150 may be integrated to the passage switching valve 100. In this case, the passage switching valve 100 closes both passages at the side of the cold-storage heat exchanger 11 and the side of the electric pump 15 in the normal cooling mode. In the cooling and cold storage mode, the passage switching valve 100 opens the passage at the side of the cold-storage heat exchanger 11, and closes the passage at the side of the electric pump 15. In the cold-release cooling mode, the passage switching valve 100 opens the passage at the side of the electric pump 15, and closes the passage at the side of the cold-storage heat exchanger 11.

In the above-described third embodiment, the evaporator 8 is disposed such that the outlet heat-exchange portion 82 is positioned at the upstream air side of the inlet heat-exchange portion 81 in the air flow direction. However, in an accumulator refrigerant cycle as in the second embodiment, the refrigerant temperature at the inlet of the evaporator 8 is lower than that at the outlet thereof. Therefore, in this case, the inlet heat-exchange portion 81 is disposed upstream in the air flow direction A, and the outlet heat-exchange portion 82 is disposed downstream in the air flow direction. Thus, the temperature difference between the air and the refrigerant can be made larger in both of the inlet and outlet heat-exchange portions 81, 82, and the heat-exchange performance of the evaporator 8 can be effectively improved.

Fourth Embodiment

In the above-described first embodiment, as shown in FIG. 2, the first check valve 13 is disposed below the cold-storage heat exchanger 11 in the tank body 10. In the normal-cooling and cold storage mode during a traveling of the vehicle, the first check valve 13 sucks the refrigerant in the cold-storage heat exchanger 11 from the inlet 13b, and introduces the refrigerant to the inlet of the evaporator 8. Therefore, the liquid surface in the liquid-refrigerant tank portion 11a is not controlled to be higher than the predetermined level set by the first check valve 13. In addition, it is necessary to store liquid refrigerant in the liquid-refrigerant tank portion 10a to a predetermined amount that is required in the cold-release cooling mode. Accordingly, the size of the tank body 10 including the liquid-refrigerant tank portion 10a is difficult to be reduced.

Figure 16:
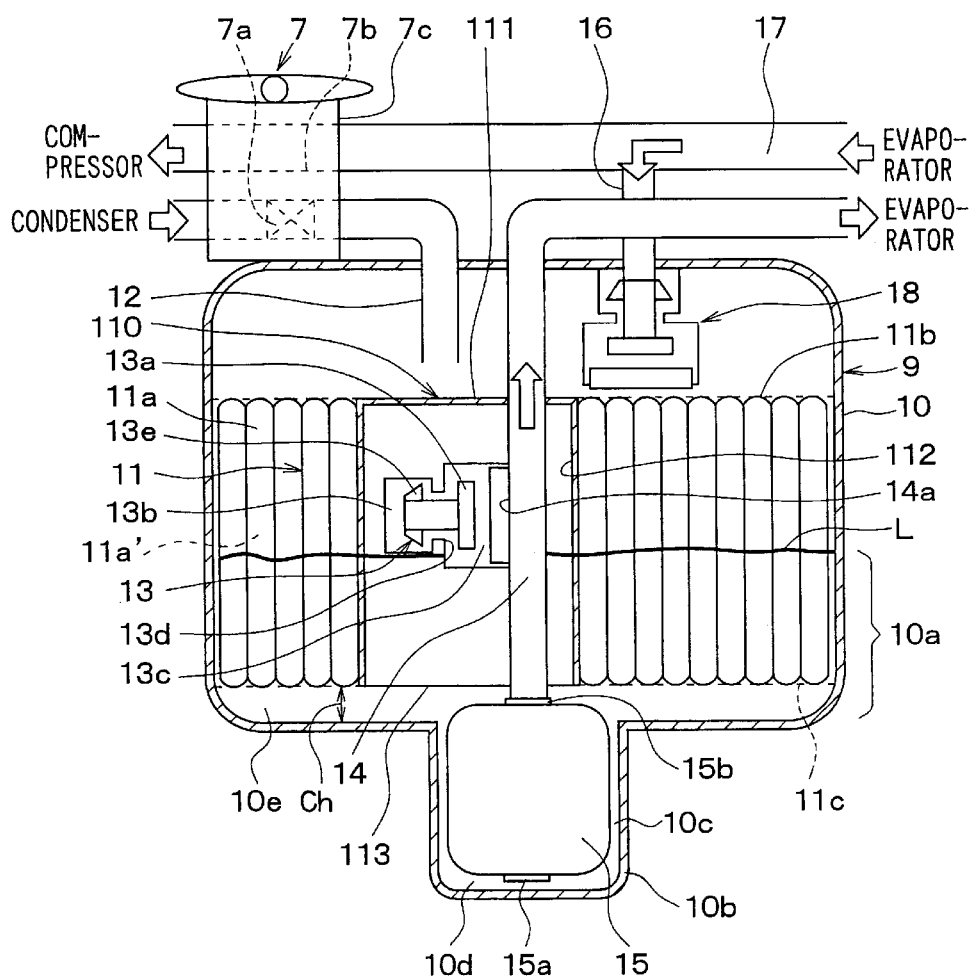
FIG. 16 is schematic sectional view showing a cold storage unit according to a fourth embodiment of the present invention.

In the fourth embodiment, the size of the tank body 10 can be effectively reduced while the capacity of the liquid-refrigerant tank portion 10a is set equal to that of the first embodiment. In the fourth embodiment, the components similar to the above-described first embodiment are indicated by the same reference numerals, and description thereof is omitted. As shown in FIG. 16, a pump container portion 10b protruding to a lower side in a cylindrical shape is provided at a center of the bottom surface of the tank body 10, and the electric pump 15 is contained in and fixed to the pump container portion 10b. A refrigerant passage 10c having a predetermined clearance is provided between an inner surface of the pump container portion 10b and an outer surface of the electric pump 15, so that refrigerant flows into a liquid-refrigerant storage portion 10d at a bottom portion of the pump container portion 10b. The suction port 15a of the electric pump 15 is located at the bottom portion of the electric pump 15, and sucks liquid refrigerant in the liquid-refrigerant storage portion 10d. A discharge port 15b of the electric pump 15 is located at a top portion of the electric pump 15, and is connected to a lower end of the outlet pipe 14.

In the cold-storage heat exchanger 11, plural cylindrical cold-storage containers 11a, shown in FIG. 3A, are disposed to extend in the up-down direction. As shown in FIG. 16, the cold-storage heat exchanger 11 is disposed near the bottom surface in the tank body 10. Specifically, a small clearance Ch (approximately 4 mm) is provided between the cold-storage heat exchanger 11 and the bottom surface of the tank body 10. Thus, a liquid-refrigerant storage space 10e having the small clearance Ch is provided in the tank portion 10 below the cold-storage heat exchanger 11. The connection port 14a of the outlet pipe 14 and the first check valve 13 are located in a portion between the top end and the bottom end of the cold-storage heat exchanger 11 in the up-down direction. For example, the first check valve 13 and the connection port 14a are provided at an intermediate position of the cold-storage heat exchanger 11 in the up-down direction. A partition member 110, for partitioning a space around the connection port 14a and the first check valve 13 from an upper space of the cold-storage heat exchanger 11, is disposed at a center area of the cold-storage heat exchanger 11.

The partition member 110 includes a circular-plate upper cover 111 and a cylindrical portion 112 located lower than the upper cover 111. The first check valve 113 is disposed inside the cylindrical portion 112, and the outlet pipe 14 penetrates through the upper cover 111 to extend in the up-down direction. Since a lower end of the cylindrical portion 112 is opened to define an opening 113, the inlet 13b of the first check valve 13 communicates only with the liquid-refrigerant storage space 10e through the opening 113, and does not communicate with the upper space of the cold-storage heat exchanger 11. Since the inlet 13b of the first check valve 13 is in the intermediate portion of the cold-storage heat exchanger 11 in the up-down direction, a liquid surface L of refrigerant stored in the tank body 10 can readily increase to a level around the inlet 13b of the first check valve 13. Thus, in the tank body 10, a space lower than the intermediate portion of the cold-storage heat exchanger 11 can be used as the storage space of the liquid refrigerant.

Accordingly, in the fourth embodiment, not only the liquid-refrigerant storage space 10e but also the space between the plural cold-storage containers 11a can be used as the liquid-refrigerant tank portion 10a. As a result, even if the volume of the liquid-refrigerant tank portion 10a is made equal to that in the above-described first embodiment, a height of the tank body 10 in the up-down direction can be largely reduced. Accordingly, the size of the tank body 10 can be reduced, and the cold storage unit 9 can be readily mounted in the vehicle. In the fourth embodiment, because the lower side of the plural cold-storage containers 11a is disposed within the liquid refrigerant, the cold storage capacity in the traveling of the vehicle and the cold release capacity at the stoppage time of the vehicle may be reduced. However, in the fourth embodiment, the capacity reduction can be sufficiently restricted by using the following manner.

First, the cold storage capacity is described. In the fourth embodiment, the space around the connection port 14a of the outlet pipe 14 and the first check valve 13 is partitioned by the partition member 110, so that the inlet 13b of the first check valve 13 communicates only with the liquid-refrigerant storage space 10e through the opening 113, and does not communicate with the upper space above the cold-storage heat exchanger 11. In the cold storage operation at the traveling time of the vehicle, the low-pressure and low-temperature refrigerant flowing from the expansion valve 7 flows into the tank body 10 through the inlet pipe 12. However, in this case, the partition member 110 prevents the refrigerant from flowing into the inlet 13b of the first check valve 13.

Accordingly, in the tank body 10, the refrigerant falls from the upper surface of the cold-storage heat exchanger 11 through the clearance portions between the plural cold-storage containers 11a, and reaches the liquid-refrigerant storage space 10e around the bottom surface of the tank body 10. Thereafter, the refrigerant passes through the opening 113, and is sucked into the inlet 13b of the first check valve 13. Thus, in the cold storage operation, the refrigerant in the tank body 10 necessarily falls in the clearance portion between the cold storage containers 11a, and pushes the liquid refrigerant stored at the lower side of the clearance portion, to be mixed with the liquid refrigerant. Therefore, even if the lower portions of the cold storage containers 11a are disposed in the liquid refrigerant, the heat transmission rate on the surfaces of the lower portions of the cold storage containers 11a can be restricted from being reduced, thereby ensuring the required cold-storage capacity.

Next, the cold-release capacity will be now described. In the cold release operation at the stoppage time of the vehicle, the electric pump 15 is operated, and the liquid refrigerant stored in the liquid-refrigerant storage portion 10d is sucked into the electric pump 15. Then, the liquid refrigerant is introduced to the evaporator 8, and is evaporated in the evaporator 8. The evaporated refrigerant (gas refrigerant) is circulated to the cold-storage heat exchanger 11, and is cooled and condensed therein. In the cold-storage heat exchanger 11, a condensation amount of the gas refrigerant is determined by heat-exchange specification of the cold-storage heat exchanger 11, such as the heat transmission area of the cold-storage heat exchanger 11 and physical characteristics of the cold storage material 11a'.

The discharge capacity of the electric pump 15 can be set larger than the condensation amount of the gas refrigerant. In this case, the liquid surface L of refrigerant in the tank body 10 can be reduced lower than the lower end of the cold-storage heat exchanger 11 in the cold release operation. Thus, the gas refrigerant flowing from the outlet of the evaporator 8 can be effectively cooled and condensed on the entire surfaces of the cold-storage heat exchanger 11, thereby preventing the cold release capacity from being reduced.

Fifth Embodiment

Figure 17:
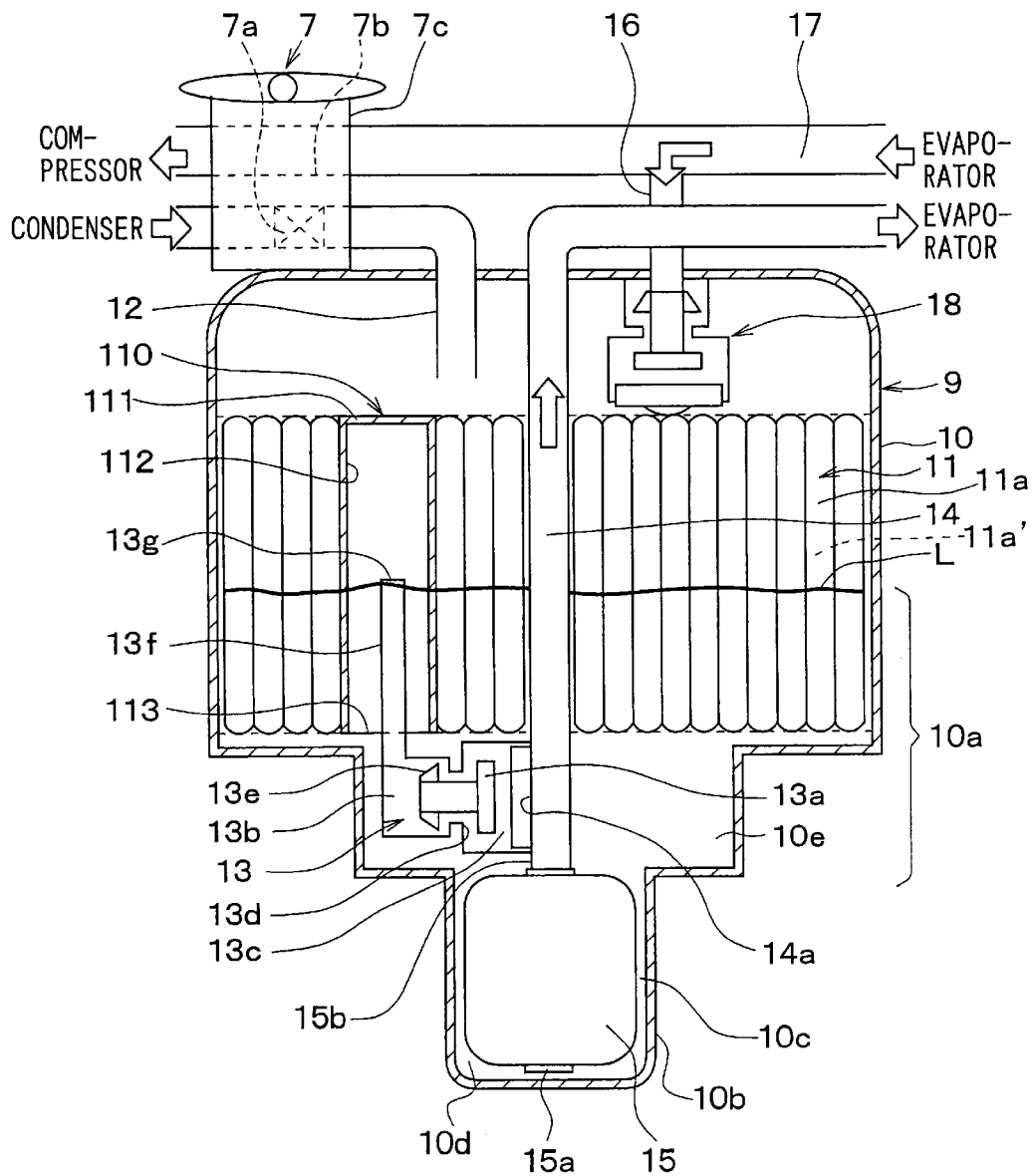
FIG. 17 is a schematic sectional view showing a cold storage unit according to a fifth embodiment of the present invention.

In the above-described fourth embodiment, the connection port 14a of the outlet pipe 14 and the first check valve 13 are disposed at the intermediate portion of the cold-storage heat exchanger 11 in the up-down direction. However, in the fifth embodiment, as shown in FIG. 17, the connection port 14a of the outlet pipe 14 and the first check valve 13 are disposed in the liquid-refrigerant space 10e under the cold-storage heat exchanger 11. Further, an inlet pipe 13f is connected to the inlet 13b of the first check valve 13, and a top end of the inlet pipe 13f is disposed in the cylindrical partition member 110. A top end opening 13g of the inlet pipe 13f is positioned at the intermediate portion of the cold-storage heat exchanger 11 in the up-down direction.

Thus, in the fifth embodiment, even if the first check valve 13 is disposed in the liquid-refrigerant storage space 10e under the cold-storage heat exchanger 11, the liquid surface L can be increased to a position of the top end opening 13g of the inlet pipe 13f, that is, to the intermediate portion of the cold-storage heat exchanger 11 in the up-down direction. Accordingly, as in the fourth embodiment, the clearance portion between the plural cold-storage containers 11a of the cold-storage heat exchanger 11 can be also used as the liquid-refrigerant tank portion 10a. As a result, in the fifth embodiment, the volume of the liquid-refrigerant storage space 10e can be largely reduced than the volume of the liquid-refrigerant tank portion 10a in the first embodiment shown in FIG. 2, so that the size of the tank body 10 can be effectively reduced.

In the fifth embodiment, because the capacity of the cylindrical partition member 110 can be reduced more than that in the fourth embodiment, the capacity of the cold-storage heat exchanger 11 can be increased by this capacity reduction, and the mount of the cold storage material 11a' contained in the cold-storage heat exchanger 11 can be increased. In the fourth and fifth embodiments, the cold storage container 11a can be formed into any one of the spherical shape shown in FIG. 3B and the capsule shape shown in FIG. 3C in place of the cylindrical shape shown in FIG. 3A.

Sixth Embodiment

Figure 18:
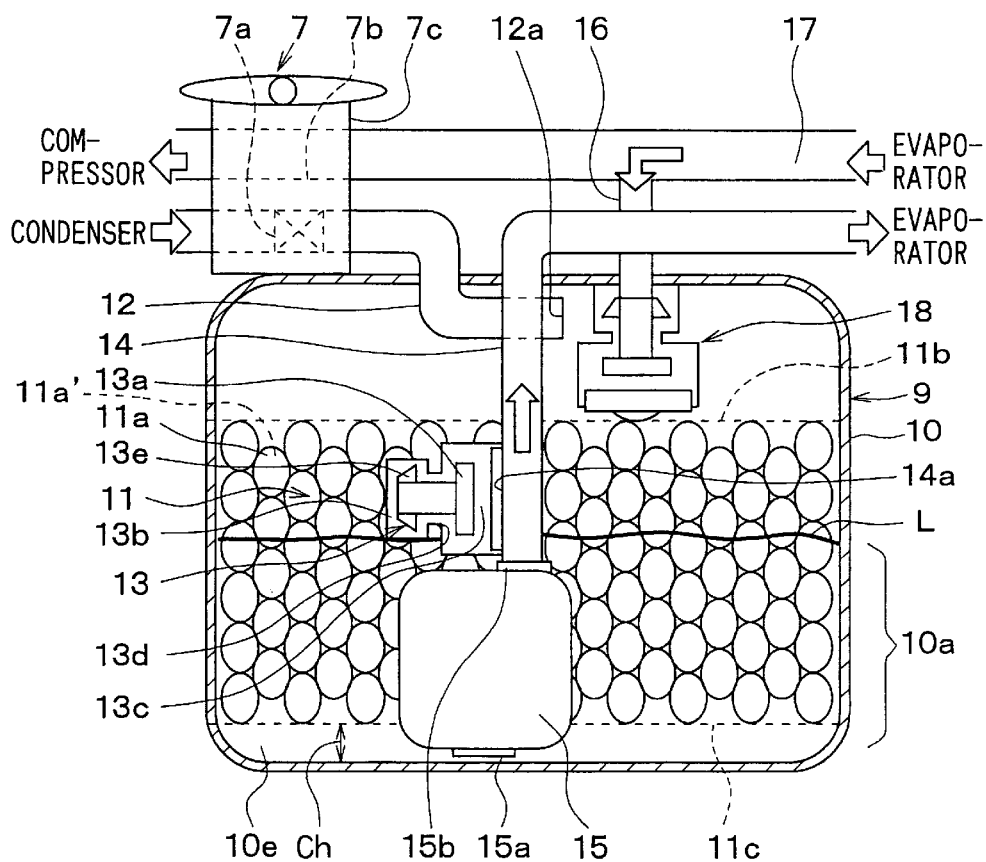
FIG. 18 is a schematic sectional view showing a cold storage unit according to a sixth embodiment of the present invention.

In the sixth embodiment, as shown in FIG. 18, the spherical cold-storage containers 11a are densely disposed directly in the space around the first check valve 13, the outlet pipe 14 and the electric pump 15. Specifically, the plural spherical cold-storage containers 11a are disposed in the space within the tank body 10 so that the spherical surfaces of the cold storage containers 11a contact each other. Accordingly, the refrigerant passage constructed of very small clearances is provided in a labyrinth shape between the spherical surfaces of the cold storage containers 11a. Further, the liquid-refrigerant storage space 10e having the small clearance Ch is provided between the lower end of the cold-storage heat exchanger 11 and the bottom surface of the tank body 10. The electric pump 15 is disposed to suck the refrigerant stored in the liquid-refrigerant storage space 10e.

In the sixth embodiment, the partition member 110 described in the fourth and fifth embodiments is eliminated. Further, in the sixth embodiment, an opening 12a of the inlet pipe 12 is disposed to be toward an opposite of the inlet 13b of the first check valve 13, that is, toward the right side in FIG. 18. Therefore, the low-pressure refrigerant flows from the opening 12a of the inlet pipe 12 to the side opposite to the inlet 13b of the first check valve 13. Further, the plural spherical cold-storage containers 11a (ball-shaped containers) are densely disposed around the first check valve 13, and the refrigerant passage constructed of very small clearances is provided in the labyrinth shape among the spherical surfaces of the plural cold-storage containers 11a. Therefore, in the cold storage operation at the traveling time of the vehicle, the low-pressure refrigerant, flowing out of the opening 12a of the inlet pipe 12, passes through the labyrinth-shaped refrigerant passage, and thereafter flows toward the inlet 13b of the first check valve 13.

Thus, even when the partition member 110 is not provided, the low-pressure refrigerant, flowing out of the inlet pipe 12, does not immediately flow toward the inlet 13b of the first check valve 13. Specifically, the low-pressure refrigerant from the inlet pipe 12 passes through the labyrinth-shaped refrigerant passage from a position separated from the inlet 13b of the first check valve 13. Therefore, in the sixth embodiment, even when the lower side of the cold-storage heat exchanger 11 is disposed in the liquid-refrigerant area without the partition member 110, the cold-storage performance can be restricted from being reduced, similarly to the fourth and fifth embodiments. Further, in the cold release operation, the discharge capacity of the electric pump 15 is set so that the refrigerant circulation amount of the electric pump 15 is made larger than the condensation amount of the gas refrigerant as in the fourth and fifth embodiments, thereby ensuring the cold release capacity as in the fourth and fifth embodiments.

In the sixth embodiment, the first check valve 13 is disposed in the cold-storage heat exchanger 11, and most of the electric pump 15 is also disposed in the cold-storage heat exchanger 11. Therefore, the size of the tank body 10, especially its height dimension can be effectively reduced. In the sixth embodiment, the partition member 110 is eliminated, and the spherical cold-storage containers 11a are densely disposed directly around the first check valve 13. Therefore, the amount of the cold storage material 11a' sealed in the containers 11a effectively increases.

Seventh Embodiment

Figure 19:
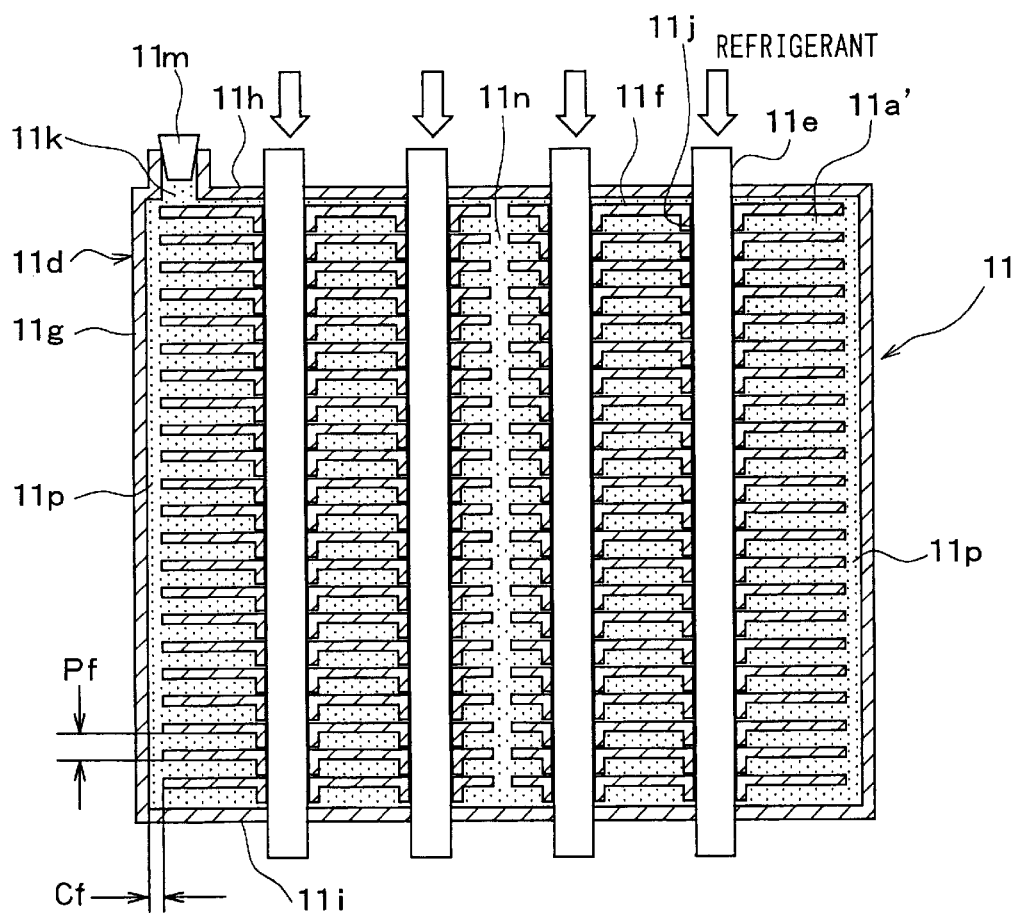
FIG. 19 is a cross-sectional view showing a cold-storage heat exchanger according to a seventh embodiment of the present invention.
Figure 20:
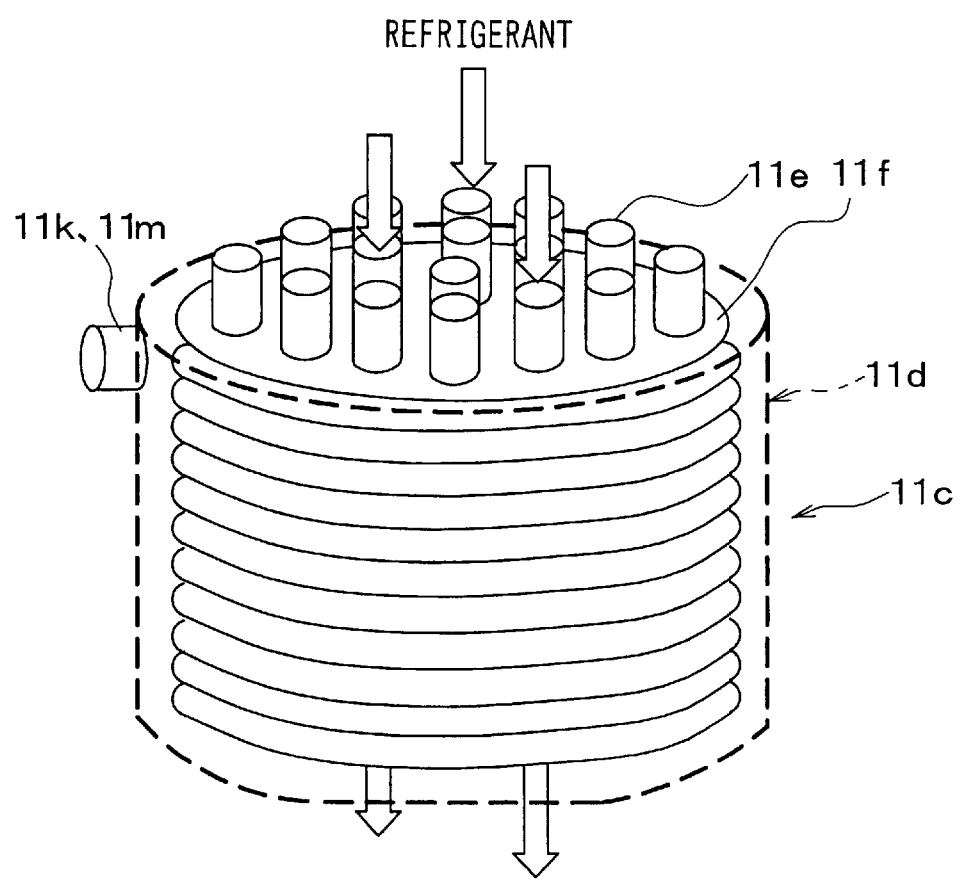
FIG. 20 is a schematic perspective view showing the cold-storage heat exchanger according to the seventh embodiment.
Figure 21:
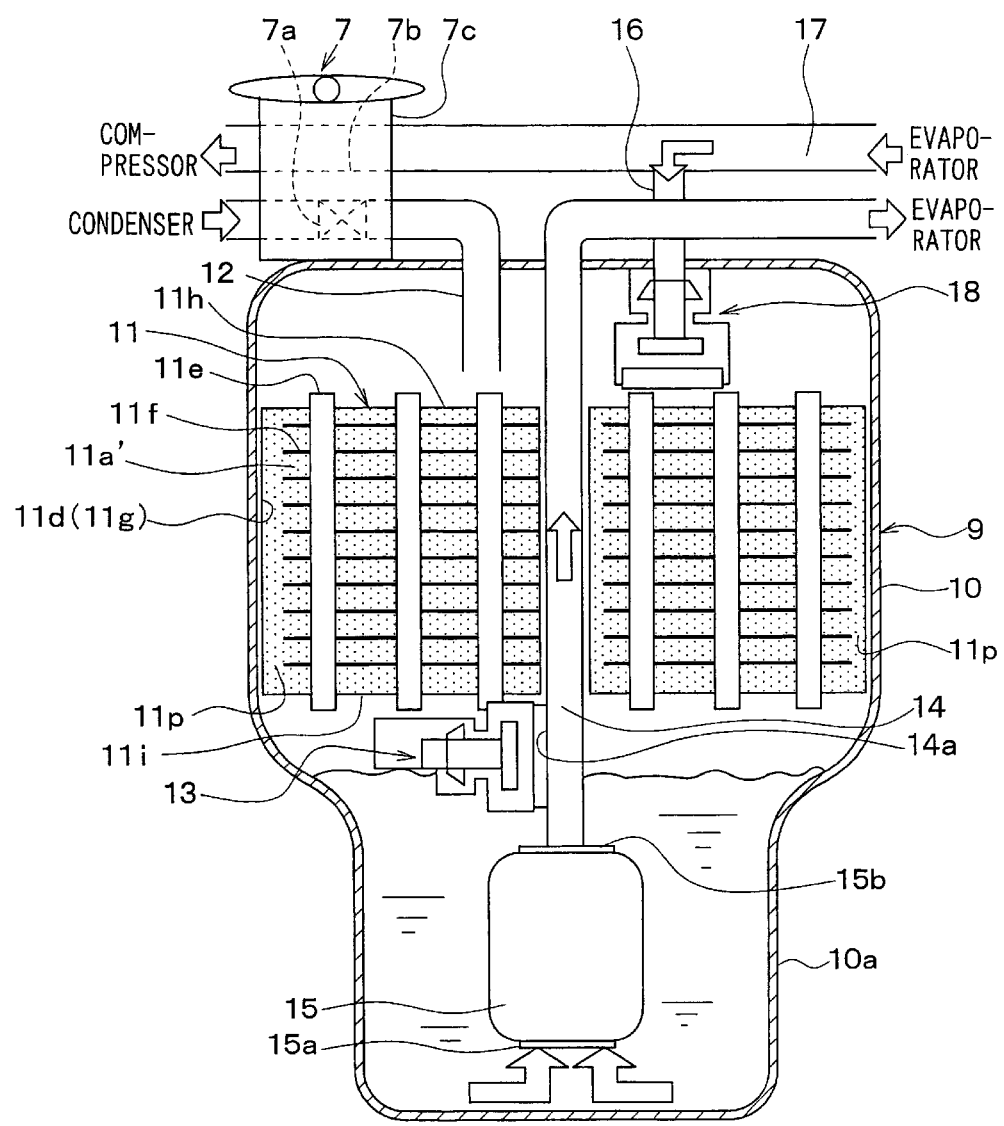
FIG. 21 is a schematic sectional view showing a cold storage unit according to the seventh embodiment.

FIG. 19 is a cross-sectional view showing a cold-storage heat exchanger according to a seventh embodiment of the present invention. Further, FIG. 20 is a schematic perspective view showing the cold-storage heat exchanger according to the seventh embodiment, and FIG. 21 is a schematic sectional view showing a cold storage unit according to the seventh embodiment. In the seventh embodiment shown in FIGS. 19–22, the size of the cold-storage heat exchanger 11, occupying a most space of the cold storage unit 9, is reduced. The cold-storage heat exchanger 11 requires a large heat transmission area corresponding to required cold storage capacity and required cold release capacity. Generally, the amount of the cold storage material 11a' contained in the cold-storage heat exchanger 11 is increased in order to increase the cold storage capacity. In this case, since the size and weight of the cold-storage heat exchanger 11 are increased, the mounting performance of the cold storage unit 9 in the vehicle is deteriorated.

As shown in FIGS. 19, 20, in the seventh embodiment, the cold-storage heat exchanger 11 is a shell-tube heat exchanger which includes a shell 11d that is a cylindrical tank body, tubes 11e fixed to the shell 11d, and fins 11f thermally integrated to the tubes 11e. The tubes 11e form therein a refrigerant passage, and the fins 11f are provided to increase the heat transmission area. The shell 111d includes a cylindrical main body 11g, an upper cover 11h and a lower cover 11i. The upper and lower ends of the cylindrical main body 11g are closed by the upper and lower covers 11h, 11i. An outer diameter of the shell 111d is set so that an outer peripheral surface of the shell 111d fits an inner peripheral surface of the tank body 10 of the cold storage unit 9, and the shell lid is fixed to the inner peripheral surface of the tank body 10.

In the seventh embodiment, each tube 11e is a circular pipe, and each fin 11f is a circular flat-plate fin. Insertion holes (barring holes) 11j, into which the tubes 11e are inserted, are provided in the fin 11f. The plural plate fins 11f are stacked with a predetermined pitch Pf, and the circular pipe tubes 11e are inserted into the insertion holes 11j. Thereafter, the tubes 11e are expanded by inserting pipes into the tubes 11, so that the fins 11f and the tubes 11e are mechanically and thermally fixed and integrated to each other. Then, the tubes 11e and the fins 11f, which are fixed to each other, are attached to the shell 11d such that the tubes 11e extend in the up-down direction. The upper ends and lower ends of the tubes 11e protrude outside of the upper and lower surfaces of the shell 11d, respectively. At this time, the tubes 11e around their upper and lower ends are fixed to the upper and lower covers 11h, 11i of the shell 11d, and these fixed portions are sealed by brazing and the like.

A metal having a high heat conductive rate such as aluminum is used for forming the tubes 11e, the fins 11f, and the components 11g, 11h, 11i of the shell 11d. An inlet port 11k, from which the cold-storage material is introduced, is provided in a portion of the shell 11d, such as in the upper cover 11h. In the shell 11d, the cold storage material 11a' is filled in clearances due to fin pitches Pf between the flat plate fins 11f. The inlet port 11k is sealed by a plug 11m after the cold storage material 11a' is filled.

Since the cold storage material 11a' is used for performing the cold storage in a vehicle air conditioner, a material, having a solidification point of 4–8° C., is preferable as the cold storage material 11a'. Specifically, paraffin (n-tetradecane) is suitably used as the cold storage material 11a'. However, paraffin used as the cold storage material 11a' has a heat transmission rate much lower than a metal. Therefore, in the seventh embodiment, a heat transmission area of paraffin is increased by reducing its layer thickness so as to increase its cold storage capacity and its cold release capacity. Specifically, in the cold-storage heat exchanger 11, paraffin is filled in a thin film shape in a very small clearance portion due to the fin pitch Pf among the fins 11f. Preferable, as described later, the fin pitch Pf is set in a range of 0.5–2 mm (more specifically, around 1.5 mm) to ensure heat transmission performance of the cold-storage heat exchanger 11 and to reduce its size.

When the operational mode changes between the cold storage mode and the cold release mode, the phase of the cold storage material 11a' is changed, and its mass density and its volume are changed. This volume change of the cold storage material 11a' generates stress to the plate fins 11f, and the stress generates metal fatigue in the cold-storage heat exchanger 11. In the seventh embodiment, as shown in FIG. 19, through holes 11n are provided in the fins 11f so that liquid cold-storage material 11a' can pass through the plural plate fins 11f in the up-down direction. In the cold release mode, when the cold storage material 11a' changes from the solid phase to the liquid phase, the volume of the cold storage material 11a' increases. In this case, the liquid cold-storage material 11a' between the fins 11f can be smoothly moved outside the fins 11f through the through holes 11n.

In FIG. 19, a single through hole 11n is provided at a center of each plate fin 11f. However, preferably, plural through holes 11n are provided in each plate fin 11f with a predetermined distance so that the liquid cold-storage material 11a' can be smoothly moved. Further, a heat-insulation clearance portion lip having a predetermined clearance Cf (e.g., approximate 2 mm) is provided between the inner peripheral surface of the cylindrical main body 11g of the shell 11d and an outer peripheral ends of the plate fins 11f. Even if the cold storage unit 9 is disposed in a high temperature area outside the passenger compartment such as in an engine compartment, the heat insulation in the cold storage of the cold storage material 11a' can be performed by the clearance portion 11p. In the seventh embodiment, the circular pipe is used as the tube 11e. Preferably, an inner diameter of the tube 11e is set smaller than 4 mm to ensure the heat transmission area of refrigerant by increasing the number of the tubes 11e. A flat tube or a tube having therein plural holes can be used as the tube 11e. Preferably, the flat tube has an equivalent diameter of approximate 1 mm to ensure the heat transmission area of refrigerant, when the flat tube is used.

Next, operational effects in the seventh embodiment will be now described. Because operation of the cold storage unit 9 in the seventh embodiment is similar to that in the above-described first embodiment, the description thereof is omitted. In the seventh embodiment, because the paraffin is filled in a thin film shape within the very small clearance portion due to the fin pitch Pf between the plate fins 11f, the heat transmission area can be effectively increased.

In a case where the cold-storage heat exchanger 11 is used for the cold-release cooling operation at the stoppage time of the vehicle, the inventors of this application studied a heat-transmission partition wall of the cold storage containers 11a in order to reduce the size of the cold-storage heat exchanger 11 while the cooling capacity is improved. Specifically, as shown in FIG. 22, a stack type S1 with a one-dimensional surface structure, a cylindrical type S2 with a two-dimensional surface structure and a spherical type S3 with a three-dimensional surface structure were studied as the heat-transmission partition wall of the cold storage containers 11a. When the same amount (600 g) of cold storage material is used for the three types S1–S3, the heat transmission area required for the same cold storage capacity and the same cold release capacity is calculated by computer simulation in each of the three types S1–S3. In FIG. 22, the heat transmission areas Ha are calculation results of the computer simulation.

In the test shown in FIG. 22, paraffin (n-tetradecane having a melting point of 5.9° C.) is used as the cold storage material 11a', and an aluminum alloy having a thickness of 0.3 mm is used as the heat-transmission partition wall. The stack type S1 can be constructed of the flat plate fins 11f in the shell-tube cold-storage heat exchanger 11 according to the seventh embodiment. Accordingly, in this case, an inner diameter Rd is a difference (Rd=Pf−h) between the fin pitch Pf shown in FIG. 19 and a thickness (h=0.3 mm) of the plate fin 11f.

As seen from the heat transmission area Ha of the heat-transmission partition wall in each type S1, S2, S3 shown in FIG. 22, the heat transmission area required for the same cold storage capacity and the same cold release capacity can be largely reduced in the heat-transmission partition wall of the stack type S1. The heat-transmission partition wall of the stack type S1 effectively reduce the size of the cold-storage heat exchanger 11. This reason is as follows. When the cold storage is performed with the phase change, the cold storage capacity is increased by reducing the thickness of the cold storage material 11a'. Here, when the same heat-transmission area is set in the three types S1–S3, the thickness (the inner diameter Rd) of the cold storage material 11a' in the type S2 is two times of the thickness of the cold storage material 11a' in the type S1, and the thickness of the cold storage material 11a' in the type S3 is three times of the thickness of the cold storage material 11a' in the type S1. Therefore, the heat transmission capacity is reduced in this order of the type S1, the type S2 and the type S3.

Accordingly, the size (corresponding to an occupied volume Vo in FIG. 22) of the cold-storage heat exchanger 11 with the stack type S1, that is, the size of the shell-tube cold-storage heat exchanger 11 including the plate fins 11f according to the seventh embodiment can be reduced as compared with the size of the cold-storage heat exchanger with the stack type S2 or S3 by 10–25%. Therefore, the mounting performance of the cold storage unit 9 in the vehicle can be improved. The unit of the occupied volume Vo shown in FIG. 22 is liter (L). A filling ratio Pr in FIG. 22 is a volume ratio of the heat-transmission partition wall and the cold storage material 11a' to the cold-storage heat exchanger 11. In the types S2, S3, the filling ratio Pr is determined only by the shape of the heat-transmission partition wall. However, in the type S1, the filling ratio Pr is not determined only by the shape of the heat-transmission partition wall. Generally, the filling ratio Pr in the type S1 is set at 0.9 in consideration of the tubes 11e.

In the test shown in FIG. 22, the thickness (0.3 mm) of the heat transmission partition wall is set to be the same, in the types S1–S3. However, in the shell-tube cold-storage heat exchanger 11 according to the seventh embodiment, refrigerant pressure is not applied to the plate fins 11f, but is applied to only the tubes 11e. Therefore, the thickness of the plate fin 11f is not required to be set to ensure resistance to refrigerant pressure. Accordingly, in the seventh embodiment, the thickness (e.g., 0.1 mm) of the plate fine 11f can be reduced than a plate thickness (e.g., 0.3 mm) of the tube 11e. If the thickness of the plate fin 11f is reduced to 0.1 mm, the fin efficiency reduction due to the fin thickness can be neglected. However, in the types S2, S3, since the refrigerant pressure is directly applied to an outer surface of the heat-transmission partition wall, its thickness cannot be reduced.

Thus, in the cold-storage heat exchanger 11 according to the seventh embodiment, the thickness of the plate fin 11f can be independently set smaller than the plate thickness of the tube 11e. Therefore, actually, the volume Vo of the cold-storage heat exchanger 11 according to the seventh embodiment can be reduced much smaller than that of the study result shown in FIG. 22. Thus, the size of the cold-storage heat exchanger 11 can be effectively reduced, and the weight thereof can be also effectively reduced.

Next, the fin pitch Pf of the fins 11f will be now described. The fin pitch Pf is suitably set in a range of 0.5–2 mm due to the following reason. If the fin pitch Pf is made larger than 2 mm, the thickness of the cold storage material 11a' increases, so that its heat transmission performance is reduced. Therefore, the cold storage capacity and the cold release capacity of the cold storage material 11a, are remarkably reduced. Accordingly, for increasing the capacity, the heat transmission area is need to be increased, so the size of the cold-storage heat exchanger 11 is increased. Therefore, preferably, the fin pitch Pf is set smaller than 2 mm. On the contrary, if the fin pitch Pf of the fins 11f is set smaller, the number of the fins 11f is necessarily increase in a unit volume of the cold-storage heat exchanger 11, and its size and its weight are increased. Therefore, preferably, the fin pitch Pf is set larger than 0.5 mm.

In the cold-storage heat exchanger 11 according to the seventh embodiment, the tubes 11e are disposed to extend in the up-down direction, so that refrigerant flows in the tubes 11e from the upper side to the lower side. Therefore, in the cold release operation, refrigerant cooled and condensed in the tubes 11e smoothly falls toward the liquid-refrigerant tank portion 10a due to its gravity. Thus, the thickness of the condensed refrigerant film (liquid refrigerant film) on the inner surfaces of the tubes 11e can be always maintained thinner, and the heat transmission capacity can be restricted from reducing due to the condensed refrigerant film on the inner surfaces of the tubes 11e in the cold release operation, thereby effectively improving the cold release capacity.

In the seventh embodiment, the through holes 11n shown in FIG. 19 are provided in the plural stacked plate fins 11f so that the cold storage material 11a' can be smoothly transferred in the up-down direction. In the cold storage operation, when the cold storage material 11a' changes from the liquid phase to the solid phase, the volume of the cold storage material 11a' reduces. At this time, the liquid cold-storage material 11a' outside the fins 11f can be smoothly supplied to the spaces between the fins 11f through the through holes 11n. Accordingly, the cold storage operation can be completed for a short time. In the cold release operation, when the cold storage material 11a' changes from the solid phase to the liquid phase, the volume of the cold storage material 11a' increases. In this case, the liquid cold-storage material 11a' in the spaces between the fins 11f can be pushed outside the fins 11f through the through holes 11n. Therefore, it can prevent an excessive large stress from being generated on the fins 11f due to the phase change (volume change) of the cold storage material 11a'. Accordingly, metal fatigue can be prevented from being generated at the connection portions between the fins 11f and the tubes 11e, thereby improving the durability in the connection portions.

In the seventh embodiment, the clearance portion 1ip is provided between the inner peripheral surface of the cylindrical main body 11g of the shell 11d and the outer peripheral ends of the plate fins 11f, thereby effectively improving the heat insulation function in the cold storage of the cold storage material 11a'. Here, as shown in FIG. 21, the cylindrical main body 11g of the shell lid is directly fitted to the inner wall surface of the tank body 10 of the cold storage unit 9. Therefore, heat outside the tank body 10 enters the cylindrical main body 11g through the tank body 10 and the wall of the cylindrical main body 11g, thereby increasing the temperature of the cold storage material 11a' in the clearance portion lip. Thus, the temperature of the cold storage material 11a' in the clearance portion lip becomes higher than its melting point, and the cold storage material 11a' is maintained at the liquid phase. A heat transmission ratio λ of the cold storage material 11a' such as paraffin and water largely reduces in the liquid phase than in the solid phase. For example, in paraffin, the heat transmission ratio λ in the solid phase is 0.28 W/mK, and the heat transmission ratio λ in the liquid phase is 0.14 W/mK. That is, the heat transmission ratio λ in the liquid phase reduces to the half of the heat transmission ratio in the solid phase.

Because the cold storage material 11a' is always present in the clearance portion lip almost in the liquid phase, the heat insulation function can be effectively obtained due to the lower heat transmission ratio of the liquid cold storage material 11a'. Therefore, even if large temperature difference is generated between the cylindrical main body 11g of the shell 11d and the fins 11f, heat can be effectively restricted from entering the cylindrical main body 11g. Therefore, even if the cold storage unit 9 is disposed in a high temperature area much higher than the melting point of the cold storage material 11a', the cold storage loss due to the high temperature outside the cold storage unit 9 can be effectively restricted. Accordingly, a heat insulation material is not required to be added to the tank body 10 of the cold storage unit 9. Alternatively, an amount of the heat insulation material added to the tank body 10 can be largely reduced. Thus, in the cold storage unit 9 according to the seventh embodiment, the size of the cold-storage heat exchanger 11 of the cold storage unit 9 can be effectively reduced, thereby improving the mounting performance of the cold storage unit 9 in the vehicle.

Eighth Embodiment

Figure 23:
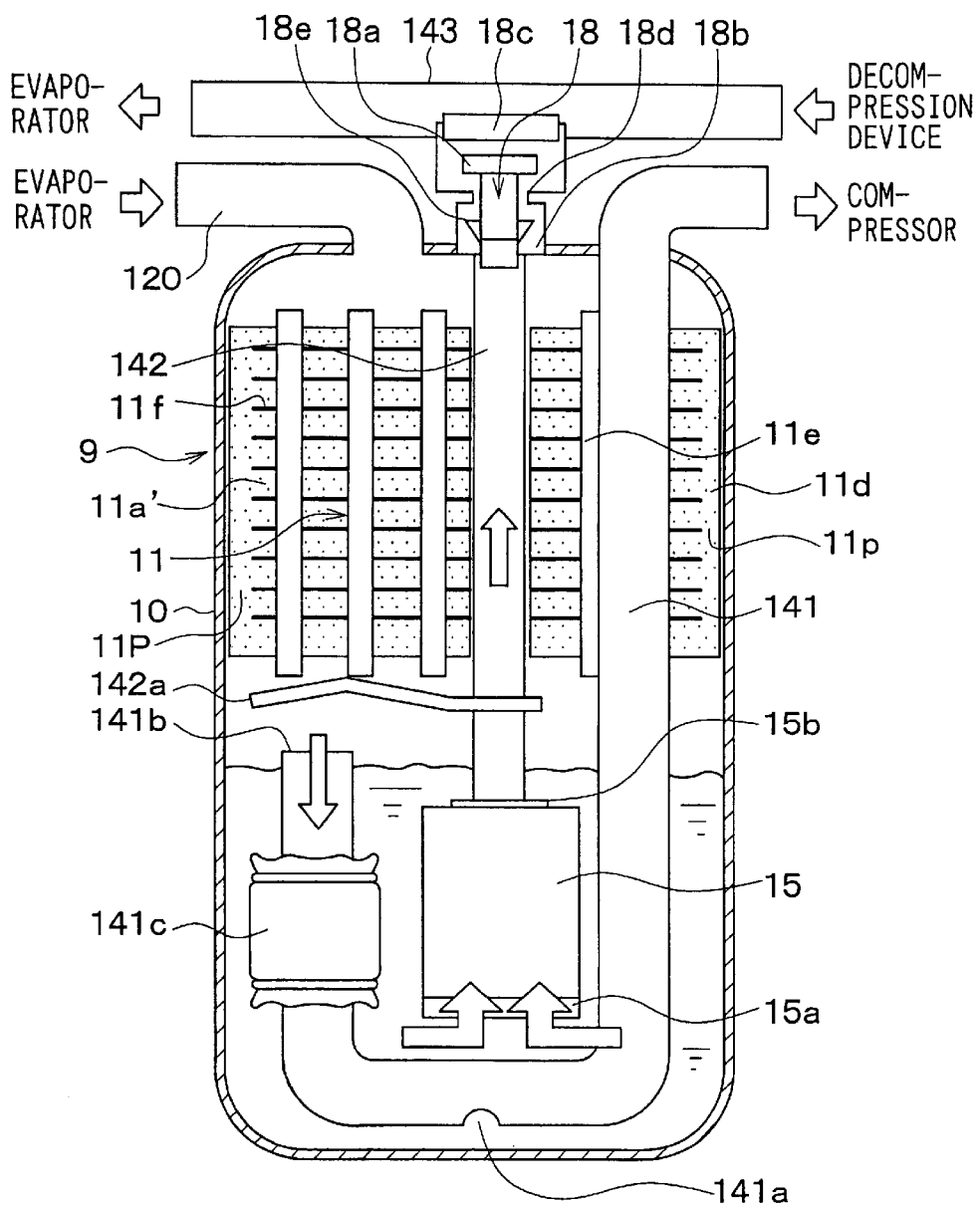
FIG. 23 is a schematic sectional view showing a cold storage unit according to an eighth embodiment of the present invention.

In the above-described seventh embodiment, as shown in FIG. 21, the cold storage unit 9 is used for an expansion-valve refrigerant cycle where the super-heating degree of refrigerant at the outlet of the evaporator 8 is controlled by the expansion valve 7. The cold storage unit 9 according to the seventh embodiment can be used for the accumulator refrigerant cycle of the second embodiment. As shown in FIG. 23, in the eighth embodiment, the cold storage unit 9 of the seventh embodiment is used for the accumulator refrigerant cycle shown in FIG. 7. In the eighth embodiment, as shown in FIG. 23, the cold-storage heat exchanger 11 according to the seventh embodiment is disposed in place of the cold-storage heat exchanger 11 of the second embodiment in the cold storage unit 9. In FIG. 23, the components similar to that in FIG. 8 are indicated by the same reference numerals, and description thereof is omitted.

Ninth Embodiment

In the above-described seventh embodiment, as shown in FIGS. 19, 20, the plural insertion holes 11j, into which the plural tubes 11e are inserted, are provided in each plate fin 11f. The plural tubes 11e are inserted into the insertion holes 11j in each plate fin 11f, and are integrally connected to each plate fin 11f at the insertion holes 11j. Therefore, this connection becomes difficult sometimes due to the variation in the diameter of the insertion hole 11j, the variation in the outer diameter of the tube 11e and the variation in the pitch between the insertion holes 11j.

Figure 24:
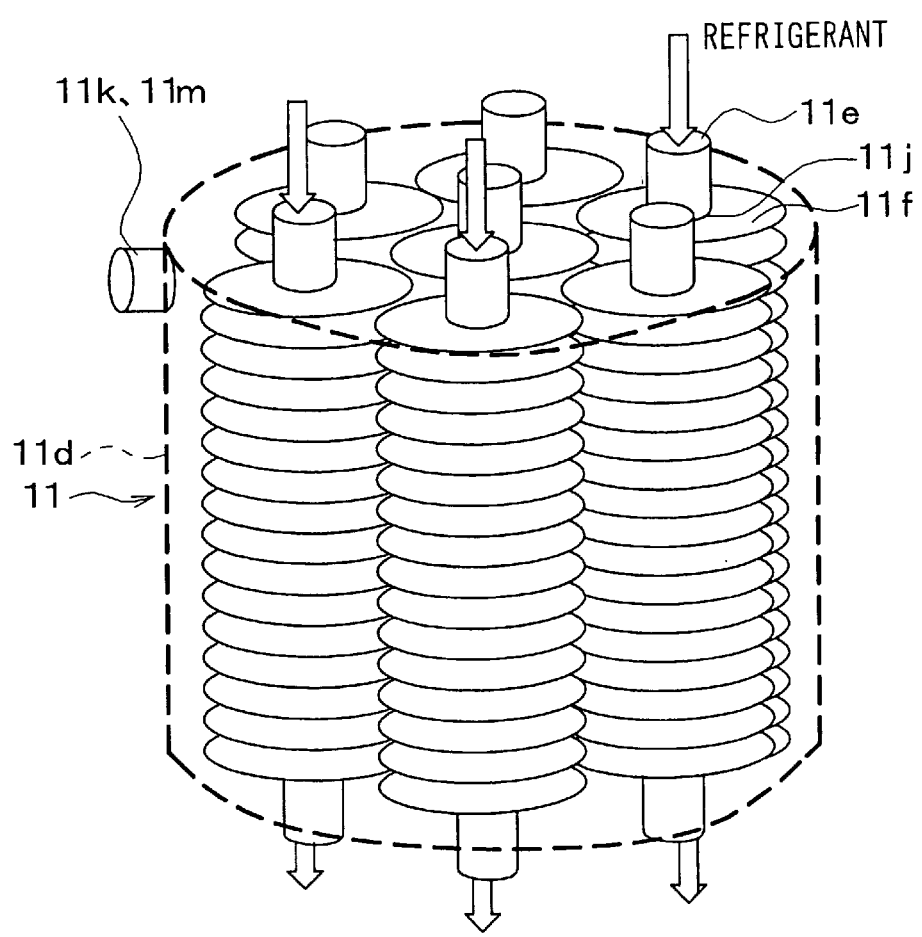
FIG. 24 is a schematic perspective view showing the cold-storage heat exchanger according to a ninth embodiment of the present invention.
Figure 25:
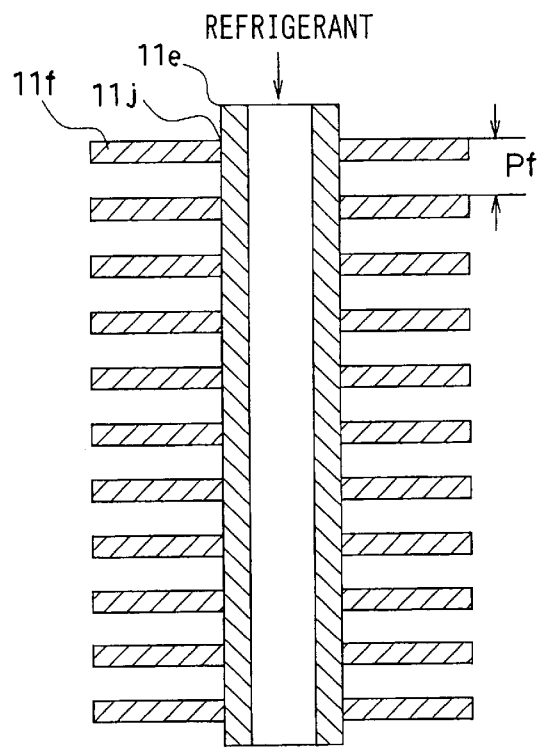
FIG. 25 is a cross-sectional view showing a main part of the cold-storage heat exchanger according to the ninth embodiment.

In the ninth embodiment, as shown in FIGS. 24, 25, the fin 11f shown in FIGS. 19, 20 is separated to plural circular plate fins 11f to correspond to the number of the tubes 11e. A single insertion hole 11j, into which the single tube 11e is inserted, is provided in each of the separated circular plate fins 11f. The single tube 11e is inserted into the single insertion hole 11j in each of the separated circular plate fins 11f, and is integrally connected to each of the separated circular-plate fins 11f at the single insertion hole 11j, thereby forming a connected body. Thereafter, the plural connected bodies are assembled in the shell 11d such that the tube 11e are extended in the up-down direction. At this time, the tubes 11e are fixed to the upper and lower covers 11h, 11i of the shell 11d shown in FIG. 19, and the fixed portions are sealed.

In the ninth embodiment, because the tubes 11e can be independently attached to the fins 11f, the connection work between the tubes 11e and the fins 11f can be performed readily, without being inversely affected by the above dimension variation. Here, the connection between the tubes 11e and the fins 11f can be performed by pipe expansion, brazing and the like, as in the above-described seventh embodiment.

Tenth Embodiment

Figure 26:
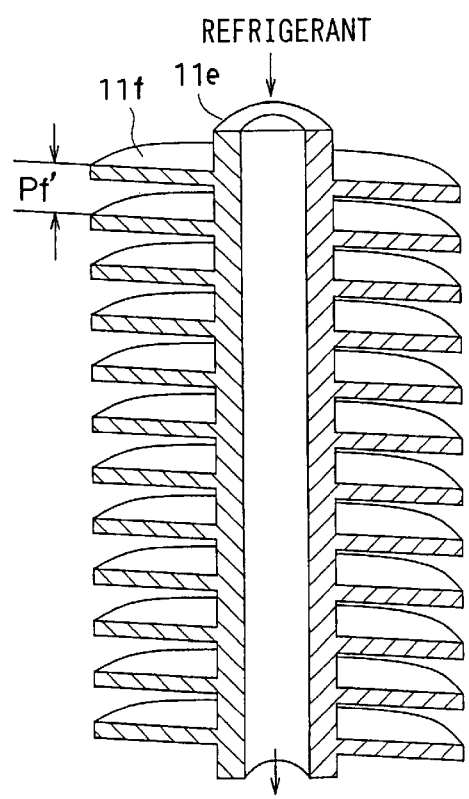
FIG. 26 is a cross-sectional view showing a main part of a cold-storage heat exchanger according to a tenth embodiment of the present invention.

In the above-described ninth embodiment, each tube 11e is inserted into the single insertion hole 11j in each of the plural separated fins 11f, to be integrally connected to the plural separated fins 11f, thereby forming the plural stacked fin body. However, in the tenth embodiment, as shown in FIG. 26, the plate fins 11f are directly integrated to an outer peripheral surface of a circular pipe tube 11e by forging. Specifically, the plate fins 11f are integrated to the outer peripheral surface in a spiral shape at a very small slant angle from a vertical plane with respect to a longitudinal direction of the tube 11e. Therefore, the fins 11f can be efficiently integrated to the outer peripheral surface of the circular pipe tube 11e in the spiral plate shape.

In fin arrangement structure, the plate fins 11f, formed in the spiral plate shape in the tenth embodiment, are different from the plate fins 11f that is disposed in parallel to each other in the seventh to ninth embodiments. However, if a spiral pitch Pf of the spiral plate fin 11f is set in the range (e.g., 0.5–2.0 mm), the size of the cold-storage heat exchanger 11 can be reduced as in the seventh to ninth embodiments. Further, the cold-storage heat exchanger 11 according to the ninth and tenth embodiments can be also applied to the cold storage unit 9 for the expansion valve refrigerant cycle shown in FIG. 21 and the cold storage unit 9 for the accumulator refrigerant cycle shown in FIG. 23.

Other Embodiments

In the above-described second embodiment, as shown in FIG. 8, the accumulator portion is integrated to the cold storage unit 9. However, the accumulator portion may be separated from the cold storage unit 9. For example, a tank body for the cold storage may be provided between the well-known type accumulator and the outlet of the evaporator 8, and the cold storage unit 9 may be constructed by the tank body.

In the above-described second embodiment, the check valve 18 is closed when the operation of the electric pump 15 is stopped in the normal-cooling and cold storage mode, so that the low-pressure refrigerant is prevented from flowing in a backward direction from the inlet pipe 143 of the evaporator 8 toward the second outlet pipe 142. Here, in a case where the low-pressure refrigerant is satisfactorily restricted from flowing in the backward direction due to refrigerant flow resistance of the electric pump 15 when the operation of the electric pump 15 is stopped, the check valve 18 can be eliminated.

Figure 27:
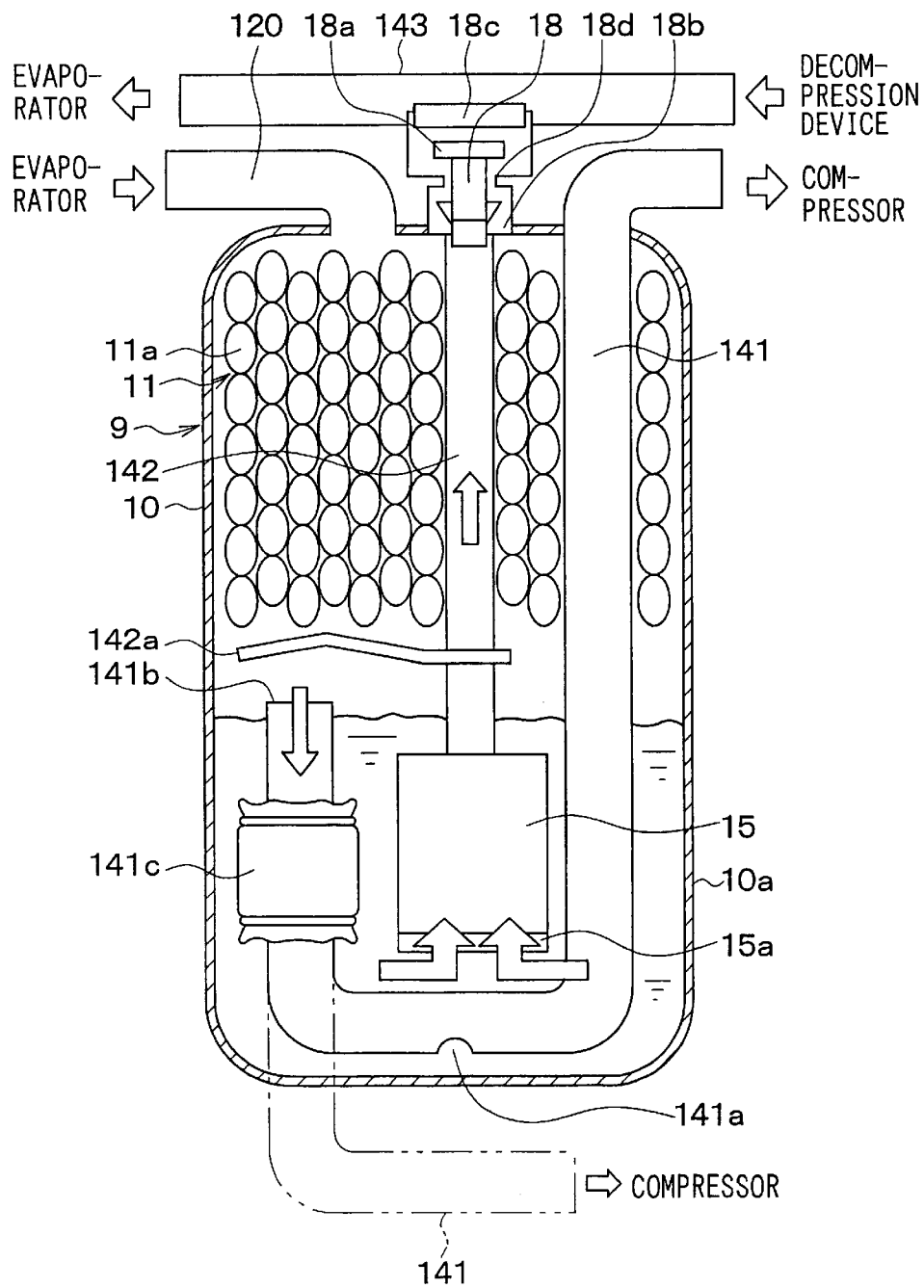
FIG. 27 is a schematic sectional view showing a cold storage unit according to a modification of the present invention.

In the above-described second embodiment, as shown in FIG. 8, the U-shaped first outlet pipe 141 is disposed in the tank body 10, and one end of the first outlet pipe 141 is taken out of the tank body 10 from its upper surface. However, as indicated by two-dot chain lines in FIG. 27, the first outlet pipe 141 may be taken out of the tank body from its bottom surface.

A sectional area of the liquid-refrigerant tank portion 10*a* is made smaller than that of the upper portion of the tank body 10 in the above-described first embodiment, and the sectional area of the liquid-refrigerant tank portion 10*a* is made identical to that of the upper portion of the tank body 10 in the above-described second embodiment. However, the sectional area of the liquid-refrigerant tank portion 10*a* may be made larger than that of the upper portion of the tank body 10, thereby ensuring a required capacity of the liquid-refrigerant tank portion 10*a*.

In the above embodiments, as shown in FIGS. 2, 8, the electric pump 15 is disposed in the liquid-refrigerant tank portion 10*a*. However, the electric pump 15 may be disposed in the outlet pipe 14 (142) outside the tank body 10. In this case, the outlet pipe 14 (142) is taken out of the liquid-refrigerant tank portion 10*a* from its lower portion, and the electric pump 15 is disposed below the liquid-refrigerant tank portion 10*a*. In this case, the operation of the electric pump 15 can be started while its suction side is filled with liquid refrigerant, thereby preventing the electric pump 15 from idling.

In the above embodiments, the present invention is typically applied to the air conditioner installed in the vehicle in which the vehicle engine 4 is automatically stopped at the stoppage time of the vehicle. However, the present invention can be applied to an air conditioner installed in a hybrid vehicle including both of the vehicle engine 4 and a electric motor for driving the vehicle. In the hybrid vehicle, the operation of the vehicle engine 4 is sometimes stopped at the traveling time of the vehicle in accordance with its traveling condition. Therefore, the cold release operation can be performed at the stoppage time of the vehicle engine 4 in the traveling of the vehicle.

Such changes and modifications are to be understood as being within the scope of the present invention as defined by the appended claims.

What is claimed is:

1. An air conditioner for a vehicle having an engine for driving the vehicle, the engine being stopped when the vehicle stops, the air conditioner comprising:
    a compressor for compressing and discharging refrigerant, the compressor being driven by the engine;
    a high-pressure side heat exchanger disposed to radiate heat of refrigerant discharged from the compressor;
    a decompression unit that decompresses refrigerant flowing from the high-pressure side heat exchanger;
    an evaporator in which refrigerant from the decompression unit is evaporated so that air to be blown into a passenger compartment of the vehicle is cooled; and
    a cold-storage heat exchanger having therein a cold storage material for performing a cold storage operation where the cold storage material is cooled by refrigerant from the decompression unit, and a cold release operation where refrigerant circulates between the evaporator and the cold-storage heat exchanger so that gas refrigerant evaporated in the evaporator is cooled by cold release of the cold storage material in the cold-storage heat exchanger, wherein:
        the cold storage heat exchanger and the evaporator are connected in series in a refrigerant flow, such that the cold storage operation of the cold storage material is performed when the compressor operates, and the cold release operation of the cold storage material is performed when operation of the compressor is stopped with a stop of the engine.

2. The air conditioner according to claim 1, wherein:
    the decompression unit is an expansion valve that adjust a flow amount of refrigerant in accordance with a super-heating degree of refrigerant at a refrigerant outlet of the evaporator; and
    the cold-storage heat exchanger is disposed upstream from the evaporator in the refrigerant flow.

3. The air conditioner according to claim 1, further comprising:
    a tank portion, in which liquid refrigerant at a low pressure side after being decompressed in the decompression unit is stored when the compressor operates, and liquid refrigerant cooled by the cold release operation of the cold storage material is stored when the operation of the compressor stops; and
    an electrical pump disposed in the tank portion, the electrical pump being operated when the operation of the compressor stops, so that liquid refrigerant in the tank portion is circulated to the evaporator.

4. The air conditioner according to claim 1, further comprising
    a tank disposed downstream from the evaporator in the refrigerant flow such that refrigerant from the evaporator is separated into gas refrigerant and liquid refrigerant in the tank, wherein:
        the tank is coupled to the compressor such that gas refrigerant in the tank is introduced to a suction portion of the compressor; and
        the cold-storage heat exchanger is disposed downstream from the evaporator in the refrigerant flow such that refrigerant after passing through the cold-storage heat exchanger passes through an inner space of the tank to be sucked into the suction portion of the compressor when the compressor operates.

5. The air conditioner according to claim 4, wherein the decompression unit is one of a fixed throttle having a fixed opening degree, and a variable throttle in which an opening degree is changed in accordance with a refrigerant state at a high-pressure side before being decompressed.

6. The air conditioner according to claim 4, wherein:
    the cold-storage heat exchanger is disposed in the tank; and
    the tank has a tank portion, in which liquid refrigerant at a low pressure side after being decompressed in the decompression unit is stored when the compressor operates, and liquid refrigerant cooled by the cold release operation of the cold storage material is stored when the operation of the compressor stops.

7. The air conditioner according to claim 6, further comprising
    an electrical pump disposed in the tank portion, the electrical pump being operated when the operation of the compressor stops, so that liquid refrigerant in the tank portion is circulated to the evaporator.

8. The air conditioner according to claim 1, wherein:
    the cold storage material is cooled and solidifies by low-pressure refrigerant after being decompressed in the decompression unit, when the compressor operates; and
    the cold storage material has a solidification point that is set to be lower than a target upper-limit temperature of air blown into the passenger compartment.

9. The air conditioner according to claim 1, further comprising:
a tank, for storing liquid refrigerant condensed in the cold-storage heat exchanger under the cold-storage heat exchanger, wherein:
when the operation of the compressor stops with a stop of the engine, liquid refrigerant in the tank is introduced to the evaporator, and gas refrigerant evaporated in the evaporator is introduced to the cold-storage heat exchanger to be cooled and condensed by the cold release operation of the cold storage material.

10. The air conditioner according to claim 9, wherein:
the cold-storage heat exchanger is disposed in the tank at an upper side to define a tank portion in the tank under the cold-storage heat exchanger; and
the liquid refrigerant is stored in the tank portion of the tank.

11. The air conditioner according to claim 1, further comprising
a pump that circulates refrigerant between the cold-storage heat exchanger and the evaporator when the operation of the compressor stops, wherein:
the pump is disposed, such that a flow direction of refrigerant in the evaporator when the operation of the compressor stops is the same as that when the compressor operates.

12. The air conditioner according to claim 11, wherein:
when the compressor operates, refrigerant from the decompression unit flows through the cold-storage heat exchanger while bypassing the pump.

13. The air conditioner according to claim 1, further comprising
a pump for circulating refrigerant between the cold-storage heat exchanger and the evaporator when the operation of the compressor is stopped; and
a tank for accommodating therein the cold-storage heat exchanger and the pump, wherein:
the tank has a tank portion at a lower side, for storing liquid refrigerant.

14. The air conditioner according to claim 13, wherein:
the cold-storage heat exchanger is disposed in the tank at an upper side; and
the pump is disposed in the tank below the cold-storage heat exchanger.

15. The air conditioner according to claim 14, wherein the pump is disposed to be exposed in liquid refrigerant in the tank portion.

16. The air conditioner according to claim 13, wherein:
the pump has a discharge side that is coupled to an inlet of the evaporator through an outlet pipe; and
the outlet pipe is disposed in the tank, and has a connection port opened in the tank, the air conditioner further comprising
a check valve that is disposed in the connection port of the outlet pipe, to allow a one-way flow of refrigerant from an inner space of the tank to the outlet pipe.

17. The air conditioner according to claim 16, wherein:
the check valve sucks refrigerant from a refrigerant suction port; and
the refrigerant suction port of the check valve is provided above a bottom end of the cold-storage heat exchanger.

18. The air conditioner according to claim 17, wherein the check valve is disposed above a bottom end of the cold-storage heat exchanger.

19. The air conditioner according to claim 17, wherein:
the check valve is disposed below the cold-storage heat exchanger; and
the refrigerant suction port is coupled to an inlet of the check valve through a pipe member, to be positioned above the bottom end of the cold-storage heat exchanger.

20. The air conditioner according to claim 17, wherein:
the cold-storage heat exchanger is disposed in the tank, such that refrigerant flowing to an upper space above the cold-storage heat exchanger flows through the cold-storage heat exchanger downwardly from above, and is U-turned in a lower space under the cold-storage heat exchanger to be sucked to the refrigerant suction port.

21. The air conditioner according to claim 20, further comprising
a partition member disposed for partitioning a space around the refrigerant suction port from the other space in the tank, wherein:
the partition member has an opening opened at a lower side of the cold-storage heat exchanger; and
when the compressor operates, refrigerant under the cold-storage heat exchanger is introduced to the refrigerant suction port from the opening of the partition member.

22. The air conditioner according to claim 17, wherein:
the pump has a discharge capacity that is set such that a flow amount of refrigerant circulated by the pump is larger than a condensation amount of refrigerant condensed in the cold-storage heat exchanger when the operation of the compressor is stopped.

23. The air conditioner according to claim 13, further comprising
a refrigerant pipe member having a refrigerant suction port from which refrigerant inside the tank is sucked to be introduced to an inlet of the evaporator, wherein:
the refrigerant suction port is disposed above a bottom end of the cold-storage heat exchanger.

24. The air conditioner according to claim 13, further comprising
a check valve that is disposed to allow a one-way flow of refrigerant from an outlet of the evaporator to an inner space of the tank.

25. The air conditioner according to claim 1, wherein:
the cold-storage heat exchanger includes a plurality of tubes through which refrigerant from the decompression unit flows, a plurality of fines disposed to be thermal-connected with the tubes, and a shell that is disposed to accommodate the tubes and the fins;
the fins are disposed to have plural heat-transmission surfaces contacting the tubes; and
the cold storage material is filled in the shell outside the tubes between the heat-transmission surfaces.

26. The air conditioner according to claim 25, wherein the tubes are disposed in the shell to extent vertically.

27. The air conditioner according to claim 25, wherein the fins are flat plates disposed substantially in parallel, by a predetermined pitch.

28. An air conditioner for a vehicle having an engine for driving the vehicle, the engine being stopped when the vehicle stops, the air conditioner comprising:
a compressor for compressing and discharging refrigerant, the compressor being driven by the engine;
a high-pressure side heat exchanger disposed to radiate heat of refrigerant discharged from the compressor;

a decompression unit that decompresses refrigerant flowing from the high-pressure side heat exchanger;

an evaporator in which refrigerant from the decompression unit is evaporated so that air to be blown into a passenger compartment of the vehicle is cooled;

a cold-storage heat exchanger having therein a cold storage material for performing a cold storage operation where the cold storage material is cooled by refrigerant from the decompression unit, and a cold release operation where refrigerant circulates between the evaporator and the cold-storage heat exchanger so that gas refrigerant evaporated in the evaporator is cooled by cold release of the cold storage material in the cold-storage heat exchanger; and a pump that circulates refrigerant between the cold-storage heat exchanger and the evaporator when the operation of the compressor stops, wherein:

the pump is disposed, such that a flow direction of refrigerant in the evaporator when the operation of the compressor stops is the same as that when the compressor operates.

29. The air conditioner according to claim 28, wherein the cold-storage heat exchanger and the evaporator are disposed in parallel, in a refrigerant flow when the compressor operates.

30. The air conditioner according to claim 28, wherein the cold-storage heat exchanger and the evaporator are disposed in series, in a refrigerant flow when the compressor operates.

31. The air conditioner according to claim 30, wherein:

the decompression unit is an expansion valve that adjust a flow amount of refrigerant in accordance with a super-heating degree of refrigerant at a refrigerant outlet of the evaporator; and the cold-storage heat exchanger is disposed upstream from the evaporator in the refrigerant flow.

32. The air conditioner according to claim 28, further comprising an accumulator tank that is disposed at a refrigerant outlet side of the evaporator, such that refrigerant flowing from the evaporator is separated in the accumulator tank into gas refrigerant and liquid refrigerant, and the gas refrigerant is introduced to the compressor, wherein:

the cold-storage heat exchanger is disposed between a refrigerant outlet of the evaporator and the accumulator tank; and the accumulator tank is disposed such that, refrigerant from the cold-storage heat exchanger is introduced to the compressor after passing through an inner portion of the accumulator tank when the compressor operates, and liquid refrigerant in the accumulator tank is introduced to the evaporator by the pump when the operation of the compressor is stopped.

33. The air conditioner according to claim 32, wherein the decompression unit is one of a fixed throttle having a fixed opening degree, and a variable throttle in which an opening degree is changed in accordance with a refrigerant state at a high-pressure side before being decompressed.

34. The air conditioner according to claim 28, wherein:

when the compressor operates, refrigerant from the decompression unit flows through the cold-storage heat exchanger while bypassing the pump.

35. An air conditioner for a vehicle having an engine for driving the vehicle, the engine being stopped when the vehicle stops, the air conditioner comprising:

a compressor for compressing and discharging refrigerant, the compressor being driven by the engine;

a high-pressure side heat exchanger disposed to radiate heat of refrigerant discharged from the compressor;

a decompression unit that decompresses refrigerant flowing from the high-pressure side heat exchanger;

an evaporator in which refrigerant from the decompression unit is evaporated so that air to be blown into a passenger compartment of the vehicle is cooled;

a tank disposed at a refrigerant outlet side of the evaporator, the tank having a tank portion at a lower side, in which liquid refrigerant is stored;

a cold-storage heat exchanger having therein a cold storage material that performs a cold storage when the compressor operates; and a pump, disposed in the tank, for circulating liquid refrigerant in the tank portion to the evaporator and gas refrigerant from the evaporator is introduced to the cold-storage heat exchanger when the operation of the compressor stops, wherein:

the tank is disposed to separate refrigerant from the evaporator into gas refrigerant and liquid refrigerant and to introduce the gas refrigerant to the compressor; and at least both of the cold storage heat exchanger and the pump are integrally disposed in the tank.

36. The air conditioner according to claim 35, wherein:

the cold-storage heat exchanger is disposed in the tank at an upper side; and the pump is disposed in the tank below the cold-storage heat exchanger.

37. The air conditioner according to claim 36, wherein the pump is disposed to be exposed in liquid refrigerant in the tank portion.

38. The air conditioner according to claim 35, wherein:

the evaporator is coupled to the tank such that refrigerant from the evaporator is introduced to the tank through a refrigerant introduction pipe; and the refrigerant introduction pipe is disposed at an upper side of the cold-storage heat exchanger.

39. The air conditioner according to claim 35, further comprising:

an outlet pipe through which a discharge side of the pump is coupled to an inlet of the evaporator; and a check valve that is disposed in the outlet pipe to allow a one-way flow of refrigerant from the pump to the inlet of the evaporator.

40. A refrigerant cycle system comprising:

a compressor for compressing and discharging refrigerant, the compressor being driven by a driving source;

a high-pressure side heat exchanger disposed to radiate heat of refrigerant discharged from the compressor;

a decompression unit that decompresses refrigerant flowing from the high-pressure side heat exchanger;

an evaporator in which refrigerant from the decompression unit is evaporated; and a cold-storage heat exchanger having therein a cold storage material for performing a cold storage operation where the cold storage material is cooled by refrigerant from the decompression unit, and a cold release operation where refrigerant circulates between the evaporator and the cold-storage heat exchanger so that gas refrigerant evaporated in the evaporator is cooled by cold release of the cold storage material in the cold-storage heat exchanger, wherein:

the cold storage heat exchanger and the evaporator are connected in series in a refrigerant flow, such that the cold storage operation of the cold storage material is performed when the compressor operates, and the cold release operation of the cold storage material is performed when operation of the compressor is stopped with a stop of the engine.

41. A cold-storage heat exchanger for a refrigerant cycle system including a compressor for compressing refrigerant and an evaporator for evaporating refrigerant decompressed in a decompression unit, the cold storage heat exchanger comprising:

a plurality of tubes through which refrigerant from the decompression unit flows;

a plurality of fines disposed to be thermal-connected with the tubes, the fins being disposed to have plural heat-transmission surfaces contacting the tubes;

a shell that is disposed to accommodate the tubes and the fins; and a cold storage material that is filled in the shell outside the tubes between the heat-transmission surfaces, for performing a cold storage operation where the cold storage material is cooled by the refrigerant flowing through the tubes when the compressor operates, and a cold release operation where refrigerant from the evaporator is cooled by a cold release from the cold storage material, wherein the cold storage material filled between the heat-transmission surfaces has a dimension smaller than a predetermined value.

42. The cold-storage heat exchanger according to claim 41, wherein the tubes are disposed in the shell to extent vertically.

43. The cold-storage heat exchanger according to claim 41, wherein the fins are flat plates disposed substantially in parallel by a predetermined pitch.

44. The cold-storage heat exchanger according to claim 43, wherein the flat plates are stacked by the predetermined pitch.

45. The cold-storage heat exchanger according to claim 43, wherein:

each of tubes is a circular pipe; and the fins extend from an outer peripheral surface of each tube to have a spiral shape.

46. The cold-storage heat exchanger according to claim 41, wherein the predetermined pitch is in a range of 0.5–2.0 mm.

47. The cold-storage heat exchanger according to claim 41, wherein the fins have a through hole which allows a movement of the cold storage material with a volume change of the cold storage material.

48. The cold-storage heat exchanger according to claim 41, wherein the fins are disposed in the shell to have a predetermined clearance between the fins and the shell.

* * * * *

UNITED STATES PATENT AND TRADEMARK OFFICE
CERTIFICATE OF CORRECTION

PATENT NO. : 6,701,731 B2
DATED : March 9, 2004
INVENTOR(S) : Yasukazu Aikawa et al.

It is certified that error appears in the above-identified patent and that said Letters Patent is hereby corrected as shown below:

<u>Title page,</u>
Item [30], Foreign Application Priority Data, add
-- May 29, 2002     (JP)     2002-155604
   Dec. 24, 2002     (JP)     2002-372092 --

Signed and Sealed this

Twenty-ninth Day of June, 2004

JON W. DUDAS
*Acting Director of the United States Patent and Trademark Office*